United States Patent
Swaminathan et al.

(10) Patent No.: US 11,567,950 B2
(45) Date of Patent: Jan. 31, 2023

(54) SYSTEM AND METHOD FOR CONFIDENTIALITY-PRESERVING RANK-ORDERED SEARCH

(71) Applicant: UNIVERSITY OF MARYLAND, COLLEGE PARK, College Park, MD (US)

(72) Inventors: Ashwin Swaminathan, San Diego, CA (US); Yinian Mao, San Diego, CA (US); Guan-Ming Su, Fremont, CA (US); Hongmei Gou, Germantown, MD (US); Avinash Varna, Greenbelt, MD (US); Shan He, Plainsboro, NJ (US); Min Wu, Clarksville, MD (US); Douglas W. Oard, College Park, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 140 days.

(21) Appl. No.: 17/112,874

(22) Filed: Dec. 4, 2020

(65) Prior Publication Data

US 2021/0109940 A1 Apr. 15, 2021

Related U.S. Application Data

(60) Division of application No. 15/274,605, filed on Sep. 23, 2016, now abandoned, which is a continuation of
(Continued)

(51) Int. Cl.
*G06F 16/00* (2019.01)
*G06F 16/2457* (2019.01)
(Continued)

(52) U.S. Cl.
CPC .... *G06F 16/24578* (2019.01); *G06F 16/3335* (2019.01); *G06F 16/48* (2019.01);
(Continued)

(58) Field of Classification Search
CPC .......... G06F 16/24578; G06F 16/3335; G06F 16/951; G06F 16/319; G06F 16/48
(Continued)

(56) References Cited

U.S. PATENT DOCUMENTS

2001/0019614 A1   9/2001   Madoukh
2002/0174355 A1   11/2002  Rajasekaran et al.
(Continued)

OTHER PUBLICATIONS

S.E. Robertson et al., "Simple Proven Approaches to Text Retrieval", Technical Report TR356, Cambridge Univ. Computer Laboratory, 1997. No copy provided, per MPEP 609. Copy submitted in grandparent U.S. Appl. No. 12/608,724.
(Continued)

*Primary Examiner* — Chelcie L Daye
(74) *Attorney, Agent, or Firm* — Squire Patton Boggs (US) LLP

(57) ABSTRACT

A confidentiality preserving system and method for performing a rank-ordered search and retrieval of contents of a data collection. The system includes at least one computer system including a search and retrieval algorithm using term frequency and/or similar features for rank-ordering selective contents of the data collection, and enabling secure retrieval of the selective contents based on the rank-order. The search and retrieval algorithm includes a baseline algorithm, a partially server oriented algorithm, and/or a fully server oriented algorithm. The partially and/or fully server oriented algorithms use homomorphic and/or order preserving encryption for enabling search capability from a user other than an owner of the contents of the data collection. The confidentiality preserving method includes using term fre-
(Continued)

quency for rank-ordering selective contents of the data collection, and retrieving the selective contents based on the rank-order.

18 Claims, 13 Drawing Sheets

Related U.S. Application Data application No. 14/104,652, filed on Dec. 12, 2013, now abandoned, which is a continuation of application No. 12/608,724, filed on Oct. 29, 2009, now abandoned.

(60) Provisional application No. 61/109,291, filed on Oct. 29, 2008.

(51) Int. Cl.
| | | |
|---|---|---|
| *G06F 16/48* | (2019.01) | |
| *G06F 16/951* | (2019.01) | |
| *G06F 21/62* | (2013.01) | |
| *H04L 9/00* | (2022.01) | |
| *H04L 9/32* | (2006.01) | |
| *G06F 16/33* | (2019.01) | |

(52) U.S. Cl.
CPC ........ *G06F 16/951* (2019.01); *G06F 21/6218* (2013.01); *G06F 21/6227* (2013.01); *H04L 9/008* (2013.01); *H04L 9/3236* (2013.01); *H04L 2209/60* (2013.01)

(58) Field of Classification Search
USPC .......................................................... 707/730
See application file for complete search history.

(56) References Cited

U.S. PATENT DOCUMENTS

| | | | |
|---|---|---|---|
| 2004/0243816 A1* | 12/2004 | Hacigumus | G06F 16/24561 |
| | | | 713/193 |
| 2005/0144162 A1 | 6/2005 | Liang et al. | |
| 2005/0147246 A1 | 7/2005 | Agrawal et al. | |
| 2005/0166046 A1 | 7/2005 | Bellovin et al. | |
| 2006/0129545 A1 | 6/2006 | Golle et al. | |
| 2007/0250486 A1 | 10/2007 | Liao et al. | |
| 2008/0077570 A1* | 3/2008 | Tang | G06F 16/951 |
| | | | 707/999.005 |
| 2008/0133565 A1* | 6/2008 | Yasuda | G06F 16/319 |
| 2008/0294909 A1 | 11/2008 | Ostrovsky et al. | |
| 2008/0313119 A1 | 12/2008 | Leskovec | |
| 2009/0157652 A1 | 6/2009 | Barbosa et al. | |

OTHER PUBLICATIONS

S. Brin et al., "The Anatomy of a Large-Scale Hypertextual Web Search Engine", Computer Networks and ISDN Systems 30: 107-117: doi: 10.1016/30169-7552(98)00110-X. ISSN 0169-7552 (1998). No copy provided, per MPEP 609. Copy submitted in grandparent U.S. Appl. No. 12/608,724.

A. Swaminathan et al., "Confidentiality-Preserving Rank-Ordered Search", ACM, Storage SS '07, Oct. 29, 2007. No copy provided, per MPEP 609. Copy submitted in grandparent U.S. Appl. No. 12/608,724.

D. Boneh et al., "Public-key Encryption with Keyword Search", Proceedings of Eurocrypt, 2004. No copy provided, per MPEP 609. Copy submitted in grandparent U.S. Appl. No. 12/608,724.

* cited by examiner

SYSTEM AND METHOD FOR CONFIDENTIALITY-PRESERVING RANK-ORDERED SEARCH

CROSS-REFERENCE TO RELATED APPLICATION(S)

This application is a divisional application of U.S. patent application Ser. No. 15/274,605, filed Sep. 23, 2016, pending, which is a continuation of U.S. patent application Ser. No. 14/104,652, filed Dec. 12, 2013, now abandoned, which is a continuation of U.S. patent application Ser. No. 12/608,724, filed Oct. 29, 2009, now abandoned, which claimed the benefit of U.S. Provisional Application Ser. No. 61/109,291, filed Oct. 29, 2008, expired, the contents of which are incorporated by reference in their entireties.

GOVERNMENT SUPPORT CLAUSE

This invention was made with government support under H9823005C0425 awarded by NSA. The government has certain rights in the invention.

BACKGROUND OF INVENTION a. Field of Invention

This invention relates to information search and retrieval. In particular, the instant invention relates to a system and method for information search and retrieval in large-scale encrypted databases, with a particular embodiment employing a confidentiality-preserving rank-ordered search.

b. Background Art

In today's information era, efficient and effective search capability of digital collections is essential in information management and knowledge discovery. At the same time, many data collections have to be stored in an encrypted form to limit their access to only authorized users in order to protect confidentiality and privacy. Examples of such data collections include medical records, corporate proprietary communications, and classified government documents. An emerging critical issue that must be addressed is how to protect data collections and indexes through encryption, while simultaneously providing efficient and accurate search capabilities.

A known method of data protection from theft or intrusion includes cryptography encryption. If the contents of a data storage system are not encrypted, any outsider intruding into the system may gain knowledge of the data content. In addition to such outsider attacks, security measures must also be taken against potential insider attacks. For example, when data storage is outsourced to a third-party data center, system administrators and other personnel involved may not be trusted to have decryption keys and thus have access to the content of the data collections. When an authorized user remotely accesses the data collection to search and retrieve desired documents, the large size of the collections can often make it infeasible to transfer all encrypted data to the user's side, and then perform decryption and search on the user's trusted computers. Therefore, new techniques are needed to encrypt and organize data collections in such a way as to allow the data center to perform effective and efficient search in encrypted data.

A number of scenarios exist where the content owner may want to grant a user limited access to search a confidential collection. For example, the searcher may be a scholar or a low-level analyst who wants to identify relevant documents from a private/classified collection, and may need clearance only for the top-ranked documents; the searcher may also be the opposing party during the document discovery phase of a litigation, who would request relevant documents from the content owner's digital collection (e.g. e-mails) be turned in. Conventional practices to accommodate such searches on hard-copy collections are extremely time consuming, and are often based on human factors (e.g. have limited memory and bounded by rules of privilege) that cannot all be directly extended to computerized practice. New algorithms and processes are thus needed to enable secure search for a variety of applications.

There has been a considerable amount of prior work on algorithms and data structures to support information retrieval. The vast majority of such work has focused on efficient representation and effective ranking There has also been minimal effort in addressing secure searching, and such effort has typically been limited to small collections. One example of a search in encrypted data and private information retrieval includes using established cryptographic tools as building blocks, and devising an encryption method to make two subparts of each encrypted term in a document to hold a special relationship to allow for determination of the presence or absence of a query term in an encrypted document. This method still incurs a significant increase in storage (for storing the specially encrypted documents) and typically involves a linear time computational complexity with respect to the number of words in the collection.

Keyword based approaches to reduce search complexity have been introduced at the expense of limited search capabilities confined by a keyword list identified beforehand The documents containing some of the keywords are first identified, and the keywords or the keyword indices are encrypted in a way that facilitates search and retrieval. Securing indices based on Bloom filters have also been proposed to further enhance search efficiency, and conjunctive keyword based searches have been investigated.

The aforementioned techniques involve a high computational complexity, and target simple Boolean searches to identify the presence or absence of a term in encrypted text. Furthermore, the aforementioned techniques cannot be easily extended to more sophisticated relevance-ranked searches over large collections.

The inventors herein have thus recognized the need for balancing privacy and confidentiality with efficiency and accuracy, which pose significant challenges to the design of search schemes for a number of search scenarios and large data collections. The inventors herein have also recognized the need for a system that focuses on secure and efficient rank-ordered search and retrieval over large data collections.

BRIEF SUMMARY OF THE INVENTION

The confidentiality preserving rank-ordered search system and method of the invention focuses on secure and efficient rank-ordered search and retrieval over large data collections. The system includes a framework to securely rank-order documents in response to a query, and techniques for extracting the most relevant document(s) from an encrypted data collection. The system and method includes collection of term frequency information for each of the documents in the collection to build indices, as in traditional retrieval systems in plaintext. The system and method further includes securing of these indices that would otherwise reveal important statistical information about the collection to protect against statistical attacks. During the search process, the query terms may be encrypted to prevent the exposure of information to the data center and other intruders, and also confine the searching entity to only make queries within an authorized scope. Utilizing the term frequencies and other document information, schemes are developed herein to securely compute relevance scores of each document, identify the most relevant documents, and reserve the right to screen and release the full content of relevant documents.

For the system and method of the invention, the proposed framework is built upon well-studied cryptographic encryption and hashing primitives. The system includes comparable performance to conventional searching systems designed for non-encrypted data in terms of search accuracy. In addition to the focus on securing the indexes and ranking, other security issues such as protecting communication links and combating traffic analysis are addressed by appropriate security protocols and randomization.

In an exemplary embodiment, the invention provides a confidentiality preserving system for performing a rank-ordered search and retrieval of contents of a data collection. The system may include a computer system including a search and retrieval algorithm using term frequency and/or similar features for rank-ordering selective contents of the data collection, and enabling secure retrieval of the selective contents based on the rank-order.

For the confidentiality preserving system described above, in an embodiment, the search and retrieval algorithm may generate a relevance score for the rank-ordering based on one or more queries. In an embodiment, the data collection and/or query may be encrypted. The data collection may include documents and/or multi-media content. The search and retrieval algorithm may include three algorithms; a baseline algorithm, a partially server oriented algorithm, and a fully server oriented algorithm.

In an embodiment, the baseline algorithm may include a pre-processing algorithm for building a secure term frequency table and an inverse data collection frequency table, and a search stage algorithm for rank-ordering in response to a query. The pre-processing algorithm may include stemming of selective components of the contents of the data collection and mapping of the stemmed components in the term frequency table. The selective components may be words, and the data collection contents may be documents. In an embodiment, the search stage algorithm may include stemming of a query term, searching of the term frequency table, generation of a relevance score, rank ordering of the selective contents of the data collection based on the relevance score, and retrieval of the selective contents of the data collection based on the rank order. The pre-processing and search stage algorithms may be executed at a user site remote from a data center for storing the data collection.

In an embodiment, the partially server oriented algorithm may include performance of selective computations at a user site remote from a data center for storing the data collection. The partially server oriented algorithm may include building of a term frequency table and/or generation of a relevance score at a user site remote from a data center for storing the data collection.

In an embodiment, the fully server oriented algorithm may include building of a term frequency table at a user site, and generation of a relevance score at a secure computing unit and/or a data center for storing the data collection.

In an embodiment, the partially and/or fully server oriented algorithms may enable search capability from a user other than an owner of the contents of the data collection.

The invention also provides a confidentiality preserving method for performing a rank-ordered search and retrieval of contents of a data collection. The method may include using term frequency and/or similar features for rank-ordering selective contents of the data collection, and securely retrieving the selective contents based on the rank-order.

For the method described above, in an embodiment, the method may further include generating a relevance score for the rank-ordering based on at least one query. The method may further include encrypting the data collection and/or query. In an embodiment, the data collection may include documents and/or multi-media content.

For the method described above, the method may further include building a secure term frequency table and an inverse data collection frequency table by stemming of selective components of the contents of the data collection and mapping of the stemmed components in the term frequency table. In an embodiment, the selective components may include words, and the data collection contents may include documents. The term frequency table may be generated at a user site remote from a data center for storing the data collection.

For the method described above, the method may further include stemming of a query term, searching of a term frequency table, generation of a relevance score, rank ordering of the selective contents of the data collection based on the relevance score, and retrieval of the selective contents of the data collection based on the rank order. In an embodiment, generation of the relevance score and rank ordering may be performed at a user site remote from a data center for storing the data collection. In an embodiment, the term frequency table and relevance score may be selectively generated at a user site remote from a data center for storing the data collection, and/or at a data center for storing the data collection.

For the method described above, the method may include using homomorphic encryption and/or order preserving encryption for enabling search capability from a user other than an owner of the contents of the data collection.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and, together with the detailed description, serve to explain the principles of the invention. In the drawings.

DETAILED DESCRIPTION OF EMBODIMENTS OF THE INVENTION

Figure 1:
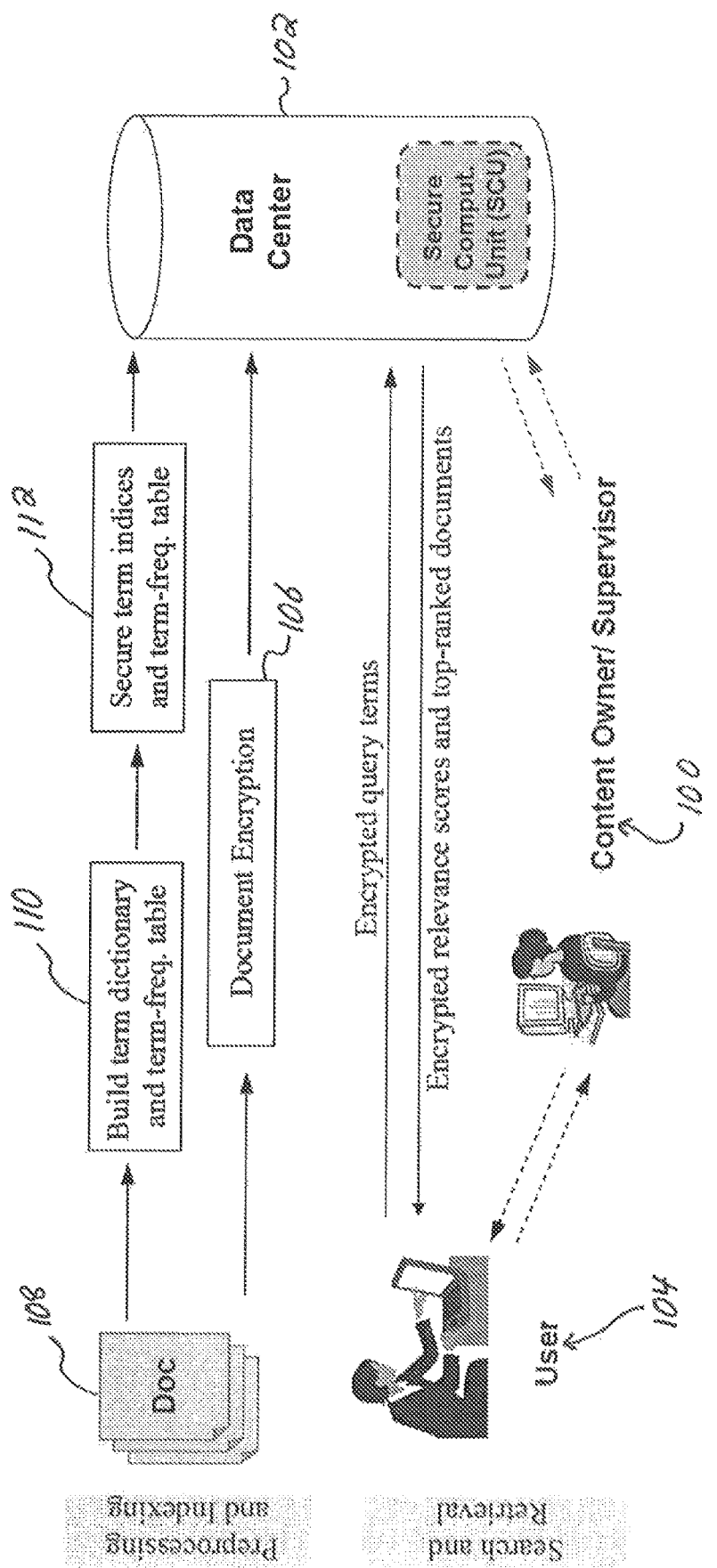
FIG. 1 is a diagram illustrating the confidentiality-preserving rank-ordered search system and method of the invention.

Referring now to the drawings wherein like reference numerals are used to identify identical components and steps in the various views, an embodiment of the confidentiality preserving rank-ordered search system and method (hereinafter the "confidentiality preserving system" or "confidentiality preserving method") will be described in detail.

Before proceeding with a detailed description of the confidentiality preserving system and method of the invention, exemplary use-cases will be described for facilitating an understanding of the invention. It should be noted that the use-cases are for exemplary purposes only and should by no means be used to limit the scope of the invention.

Scenarios of Secure Search

This section discusses representative scenarios where the secure search over a document collection may take place. As shown in FIG. 1, a diagram illustrating the confidentiality-preserving rank-ordered search system and method of the invention is illustrated. Referring to FIG. 1, a content owner 100, (e.g. a supervisor), uses the services of a data center 102 to store a large amount of documents, as well as perform search and retrieval. The content owner may also grant another user 104 the permission to search and retrieve his/her documents through the data center. Additionally, to prevent leakage of information against potential hacker attack, the documents stored at the data center are encrypted at location 106. The content owner manages the content decryption keys and may provide decryption services upon the user's request. In the following discussion, a few application scenarios will be examined under this framework.

Case 1: The content owner wants to search for some documents stored at the data center. He/she has a limited bandwidth connection with the data center, and needs to search through the encrypted content without downloading the entire collection. Furthermore, the content owner does not trust the data center with his/her unencrypted content. He/she wants to remotely search and retrieve top-ranked relevant documents without revealing the search terms, document content, and/or document index information to the data center. This scenario will be referred to as the confidentiality preserving baseline model, as discussed below, where the scheme enables both the confidentiality protection and the use of term frequency (discussed below) to achieve secure and efficient retrieval.

Case 2: Next, consider the scenario where a user, who is not the content owner, wants to search for a particular phrase in the set of confidential documents held by the data center. This scenario may arise in a number of cases, for example, where the user may be a scholar or a low-level analyst who wants to search relevant documents from a private/classified collection, and may need clearance only for the top-ranked documents. The user may also be the opposing side in a litigation requesting relevant documents from a digital collection (e.g. e-mails) be turned in by the content owner's side. In general, the content owner does not trust the data center with the document content or the term frequency values. However, it is considered herein that the data center has a secure computing unit (SCU), which is trusted by the content owner to some degree. Depending on the level of trust on the SCU by the content owner, the following exemplary scenarios are identified:

Case 2a: the content owner trusts the SCU both with the plain-text documents and the associated term-frequency table (discussed below).

Case 2b: the content owner trusts the SCU with the plain-text term-frequency values, but not with the plain-text documents.

Case 2c: the content owner does not trust the SCU with either the term-frequency values or the documents in plain-text form, but trusts the SCU with certain computations to be performed on some encrypted version of the term-frequency (TF) table without disclosing the exact values.

In Cases 2a and 2b, the content owner trusts the SCU with the term frequency values. In this case, the SCU can be considered as a heavily guarded "Maximum-Security Computing Unit" (MaxSCU) in the data center that can be used to decrypt term frequency (TF) table, compute relevance scores using EQ-1 (see below), and rank-order the documents based on these values. The baseline model introduced under the Confidentiality Preserving Baseline Model section can be the solution under this scenario. The MaxSCU, however, is a critical link of the overall system security and may be subject to heavy attacks, and as such, it can be expensive to design and maintain such a unit hosted in a data center.

In Case 2c, adversaries' threat on breaking the SCU is alleviated as the SCU only sees some encrypted index data and not the exact plain-text values. As such, a SCU with medium security (MedSCU) can be sufficient. This scenario calls for two layers of carefully designed encryptions to allow the SCU to compute relevance scores in the encrypted-domain of the first layer and enhance confidentiality outside the SCU with an outer-layer encryption. Two exemplary schemes (e.g. homomorphic encryption (HME) and order-preserving encryption (OPE)) to accomplish this objective are discussed below in the Secure Ranking of Document Relevance section presented below.

If the content owner does not trust the SCU with any plain-text or encrypted data, the content owner's involvement would be required in computing the relevance score. Thus it would reduce to the baseline model discussed in the Confidentiality Preserving Baseline Model section presented below.

Before proceeding with a detailed description of the aforementioned baseline model, and fully and partially server oriented schemes, as term frequency statistics of a collection are useful for ranked retrieval, the concepts will be briefly discussed to facilitate development of the proposed schemes.

Term Frequency

Referring to FIG. 1, consider a data collection 108 that contains $N^{(D)}$ documents, in which $N^{(T)}$ unique terms appear. The term frequency information for all terms and all documents can be organized as a table at location 110 of size $N^{(T)} \times N^{(D)}$, in which the entry at $i^{th}$ row and $j^{th}$ column indicates the number of occurrences of the $i^{th}$ term in the $j^{th}$ document. Term frequency has been employed as a core variable to define the relevance score in rank-ordering documents in a collection. One example metric is the Okapi relevance score CW(i, j), which is defined as:

$$W(i, j) = \frac{CFW(i)TF(i, j)(K_l + 1)}{K_l(1 - b + b \cdot NDL(j)) + TF(i, j)},\quad\text{(EQ-1)}$$

where N(i) is the number of documents containing the $i^{th}$ term; NDL(j) represents the normalized length of the $j^{th}$ document and is given by dividing the length of the $j^{th}$ document, L(j), by the average document length $L_{avg}$, i.e., $NDL(j)=L(j)/L_{avg}$; and $K_l$ and b are constants chosen to achieve the best performance for the particular collection (see S. E. Robertson and K. S. Jones, "Simple Proven Approaches to Text Retrieval," *Technical Report* TR356, Cambridge University Computer Laboratory, 1997). Exemplary values are $K_l$=2 and b=0.75. CFW(i) denotes the cumulative frequency of the $i^{th}$ word in the whole collection and is given by $CFW(i)=\log(N^{(D)}/N(i))$. The CFW plays an equivalent role as the inverse document frequency used in some information retrieval schemes. It can be either pre-computed or obtained concurrently from the term frequency table.

Given a query consisting of a single term w(i), the set of relevance scores $\{CW(i, j), j=1, \ldots, N^{(D)}\}$ can be directly used to identify the most relevant documents, which have the largest relevance scores over the above set $\{CW(i, j), j=1, \ldots, N^{(D)}\}$. If a query contains multiple terms $\{w(i_1), w(i_2), \ldots, w(i_M)\}$, the relevance scores for each of the query terms are added, i.e., $\{\Sigma_{i_k=i_1}^{iM}CW(i_k, \forall j), \forall j\}$, and this overall score vector is employed to rank-order the documents. The term frequency table and indices may be secured at location 112.

The confidentiality preserving baseline model, and fully and partially server oriented schemes will now be discussed in detail in the following sections.

Approach/Scheme I—Confidentiality Preserving Baseline Model

As discussed above, the confidentiality preserving system and method of the invention includes a unique framework for performing ranked search securely and efficiently without revealing the indexing information. For the baseline scheme, it is assumed that the data center can only be trusted with data storage and should not be allowed to obtain any information about the stored data. To achieve secure search, the baseline model is proposed that involves multiple rounds of interaction between the client and server to obtain the relevant information pertaining to a query. It should be noted that various aspects of the fully and partially server oriented schemes will also be discussed in conjunction with the baseline model ide a full understanding of the invention. The proposed framework may include two major stages, a pre-processing stage for building a secure term frequency table and an inverse document frequency table, and a search stage for rank-ordering documents in response to a particular query while preserving the confidentiality of term frequency information.

Indexing Stage to Secure Term Frequency

The pre-processing is executed once by the content owner, when he/she stores the documents, all in encrypted form, in the data center. The major task of the pre-processing stage is to build a secure term frequency table and an inverse document frequency table, so as to facilitate efficient and accurate information retrieval.

Figure 2:
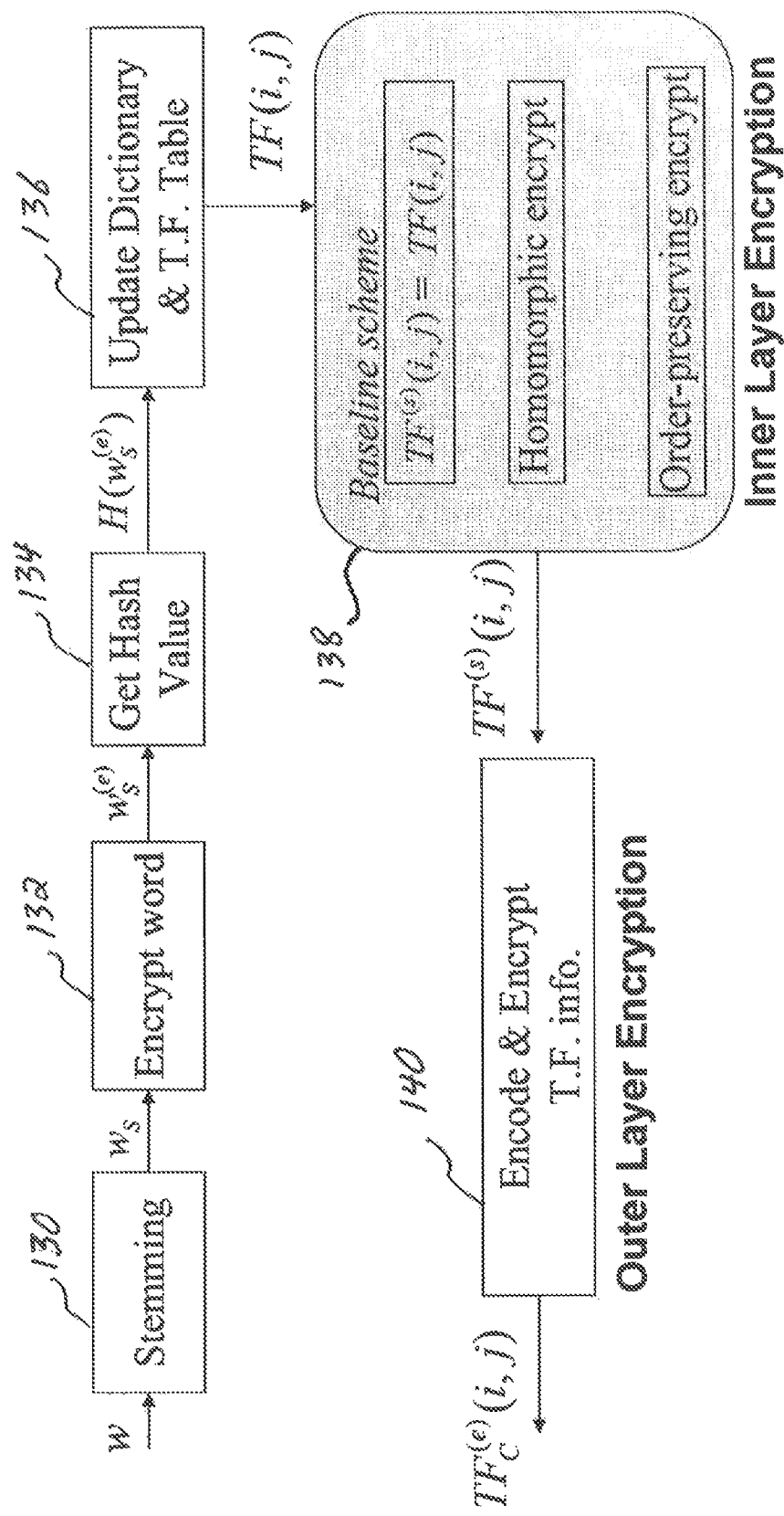
FIG. 2 is a diagram illustrating the generation and securing of index information.

For an unprotected term frequency table, both the search term and its term frequency information are in plain text. To protect the confidentiality of the search, both of them may be encrypted in an appropriate way. As shown in FIG. 2, a diagram illustrating the generation and securing of index information for the baseline model is illustrated. Referring to FIG. 2, a word w in a document first undergoes stemming at location 130 to retain the word root while removing the word ending to obtain $w_s$. The stemmed word may then be encrypted at location 132 using an encryption function E and the word-key $K_{w_s}$, obtaining the encrypted word $w_s^{(e)}$=E($K_{w_s}, w_s$). The word key may be unique to each stemmed word and is obtained using the stemmed word and a pre-defined master key. The encrypted word, $w_s^{(e)}$ is further mapped to a particular row i in the term frequency table, where the index i is established via a hashing function at location 134 such that i=H($w_s^{(e)}$). With the stemmed word, the term frequency information is collected by counting the number of occurrences of the stemmed word in the $j^{th}$ document and stored in the table entry {TF(i, j)} at location 136.

This process is repeated to obtain the term frequencies for all terms and documents, which are then further encrypted. In the baseline model discussed herein, where the data center can only be trusted with storing data, a single layer of encryption is sufficient to protect the term frequency information from both unauthorized users and from the data center. The term frequency information, i. e., $TF^{(s)}(i, j)$=TF(i, j), is directly used at location 138. If needed, proper encoding can be performed to minimize the required storage. The encoded term frequency table denoted by $TF_C^{(s)}$ is then encrypted to create $TF_C^{(e)}$ at location 140 as follows:

$$TF_C^{(e)}(i,.)=E(K_1^{(TF)}, TF_C^{(S)}(i,.))\quad\text{(EQ-2)}$$

Here, $TF_C^{(s)}(i,.) =C(TF^{(s)}(i,.))$ represents the encoded term frequency values obtained through an encoding function C that removes redundancies in the term frequency table. $K_i^{(TF)}$ denotes the key used to encrypt the $i^{th}$ row of the term frequency table $TF^{(s)}$. To increase the security, the value of $K_i^{(TF)}$ is unique for each row and is derived from the word-key $Kw_s$ corresponding to the $i^{th}$ row. Thus, even if the key corresponding to one row is compromised, no information can be obtained about other rows of the term frequency table.

Secure Search Stage

Figure 3:
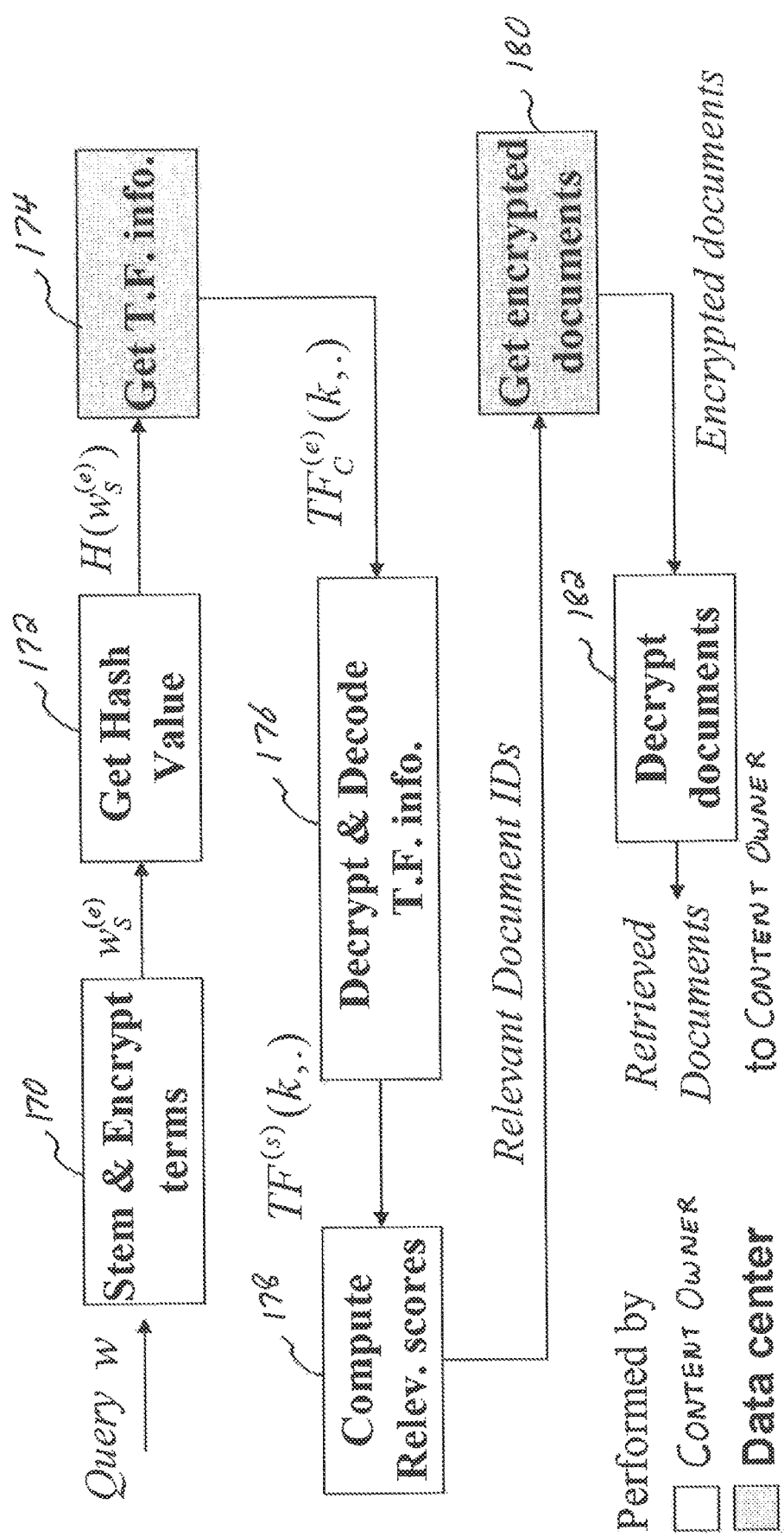
FIG. 3 is a diagram illustrating search and retrieval for a confidentiality-preserving baseline model scheme according to the invention.

In the baseline model discussed herein, search and retrieval is initiated by the content owner. As shown in FIG. 3, a diagram illustrating search and retrieval for the confidentiality-preserving baseline model scheme is illustrated. Referring to FIG. 3, when searching for a particular word w in the collection, the content owner first performs stemming at location 170 to obtain the stemmed word $w_s$. The word-key is then derived from the master key and used to encrypt the stemmed-word $w_s$ to obtain $w_s^{(e)}$. After that, the hash value of $w_s^{(e)}$ is calculated at location 172 and sent to data center. Using the received hash value k=H($w_s^{(e)}$), the data center searches the protected term frequency table $TF_C^{(S)}$ at location 174 and identifies the row corresponding to the query word w. In this way, the query content is concealed from the data center.

After the data center identifies the target row $TF_C^{(e)}(k,.)$ from the encrypted term frequency table $TF_C^{(e)}$ based on the calculated value of $k=H(w_s^{(e)})$, that particular row $TF_C^{(e)}(k,.)$ is sent back to the content owner, who then decrypts and decodes at location 176 to obtain the plain-text term frequencies $\{TF(k, j) \forall j\}$. The content owner further computes relevance scores at location 178 from the term frequency values as in EQ-1, rank-orders the documents based on the score, and requests the most relevant documents from the data center at locations 180, 182. When a query consists of multiple terms, $w(i_1), w(i_2), \ldots, w(i_m)$, these M corresponding rows in TF table are identified, $TF_C^{(e)}(i_1,.), TF_C^{(e)}(i_2,.), \ldots, TF_C^{(e)}(i_M,.)$, and sent back to the content owner for computing relevance scores. The content owner uses the received information to compute the relevance scores for each term, and then combines them to obtain the final score.

As discussed in detail herein and below with regard to the baseline model, or the fully and partially server oriented schemes, in the baseline scheme, all of these term frequency rows will be sent back to the user side for computing relevance scores using the combined information. In the partially server oriented scheme, after the term frequency rows $TF_C^{(e)}(i_1,.), TF_C^{(e)}(i_2,.), \ldots, TF_C^{(e)}(i_M,.)$ go through out-layer decryption and decompression, the server will perform part of the combination, which is then sent back to the user side for obtaining the final relevance scores. In the fully server oriented scheme, after the outer-layer decryption and decompression on all the M related term frequency rows, the server computes relevance scores for each of them, and then does the combination to obtain the final scores.

TABLE 1

Comparison of the Proposed Techniques

| Property | Baseline | Partial Server Oriented | Fully Server Oriented |
|---|---|---|---|
| No. of Communication Rounds | 2 | 2 | 1 |
| Bandwidth requirement for communication | High | Medium | Low |
| Memory Storage required at Server | Low | Low | Medium |
| Memory Storage required at User | Medium | Medium | Low |
| Security w.r.t. outsiders | High | High | High |
| Security w.r.t. Server | High | High/Medium | Medium |

Comparison of the Three Searching Schemes: In Table I (Comparison of the Proposed Techniques. The scale of low, medium and high only represents the relative values. These are intended for comparison purposes, and do not signify the performance in absolute terms), the proposed three searching schemes are compared in terms of storage, bandwidth requirement, and security. Each of the three approaches has its advantages and disadvantages, and may be suitable for different scenarios depending on the system constraints. It is usually up to the application requirement and user preferences to choose the most appropriate searching scheme in consideration of the specific threat model. In the subsequent discussion, techniques developed for each of the three schemes are presented in greater detail. For the baseline scheme, as the whole term frequency rows are transmitted from the server to the user during the searching process, compression of term frequencies will be discussed for saving communication bandwidth. For the partially and fully server oriented schemes, one important consideration will be developing appropriate inner-layer encryption algorithms to achieve a good tradeoff between data security, retrieval accuracy, and searching efficiency.

In the baseline model, the data center does not get access to the unencrypted content at any point of time both during the pre-processing and the search and retrieval stage. The data center does not know the term frequency information as they are stored encrypted. The only information that the data center gains from the search process is the retrieval log. The retrieval log at most contains data on which user searched for what encrypted queries, when and how often. The data center may also learn which documents were requested pertaining to the encrypted search queries. Based on such information collected over a period of time, the data center may launch some kinds of statistical attacks. However, such attacks can be easily mitigated by the content owner, by adding to his/her requests some phantom terms and document indices to obfuscate the access statistics of his/her intended terms and documents. The content owner can also hide his/her identity by introducing a proxy in his/her connection link with the data center.

Encoding the term frequency rows helps reduce the bandwidth required for its transmission during the search phase. Value-precision encoding is used herein for encoding to compress the term-frequency rows, wherein the position and the value of every non-zero term is encoded in the term-frequency table. As an example, the results with 200,000 e-mails from the Enron e-mail corpus suggest that the average size of the compressed term frequency rows is 435 bytes, and 86% of them have a size within 200 to 300 bytes (see B. Klimt and Y. Yang, "Introducing the Enron Corpus," *Conf. On Email and Anti-Spam (CEAS)*, Mountain View, Calif., 2004). Thus, by encoding, the required bandwidth in transmitting the term frequency rows can also be minimized.

Since computing the relevance score requires the use of cumulative frequency of a word (CFW) as in EQ-1, the CFW can be computed before-hand and encrypted using the same word key as in the term frequency table. The CFW is then stored in the data center separately from the term frequency. It can be sent to the content owner along with the term frequency rows during relevance computation. If the relevance score is computed by the data center, the CFW can be stored in the data center in clear-text form.

Secure Ranking of Document Relevance

The baseline model previously introduced provides secure and effective search to the scenarios where the content owner makes a query himself/herself. In this section, two different schemes, namely homomorphic encryption and order-preserving encryption (each discussed in greater detail below), are presented for enabling the search capability from a user other than the content owner. These schemes reduce the involvement of the content owner either partially or completely by shifting the task of computing the relevance score to the data center, while still maintaining the confidentiality of the term frequency information and the document content. To achieve the goal, an additional layer of encryption on the term frequency information is designed. This additional layer of encryption is referred to as the inner-layer encryption. Two different types of inner-layer encryptions/schemes, namely, homomorphic encryption and order-preserving encryption are discussed herein. After the inner-layer encryption, $TF^{(s)}$ is encoded to obtain $TF_C^{(s)}$, and further encrypted to obtain $TF_C^{(e)}$ in the same way as in the baseline scheme. This second round of encryption is referred to as outer-layer encryption, which prevents unauthorized users from accessing term frequency information.

Figure 4:
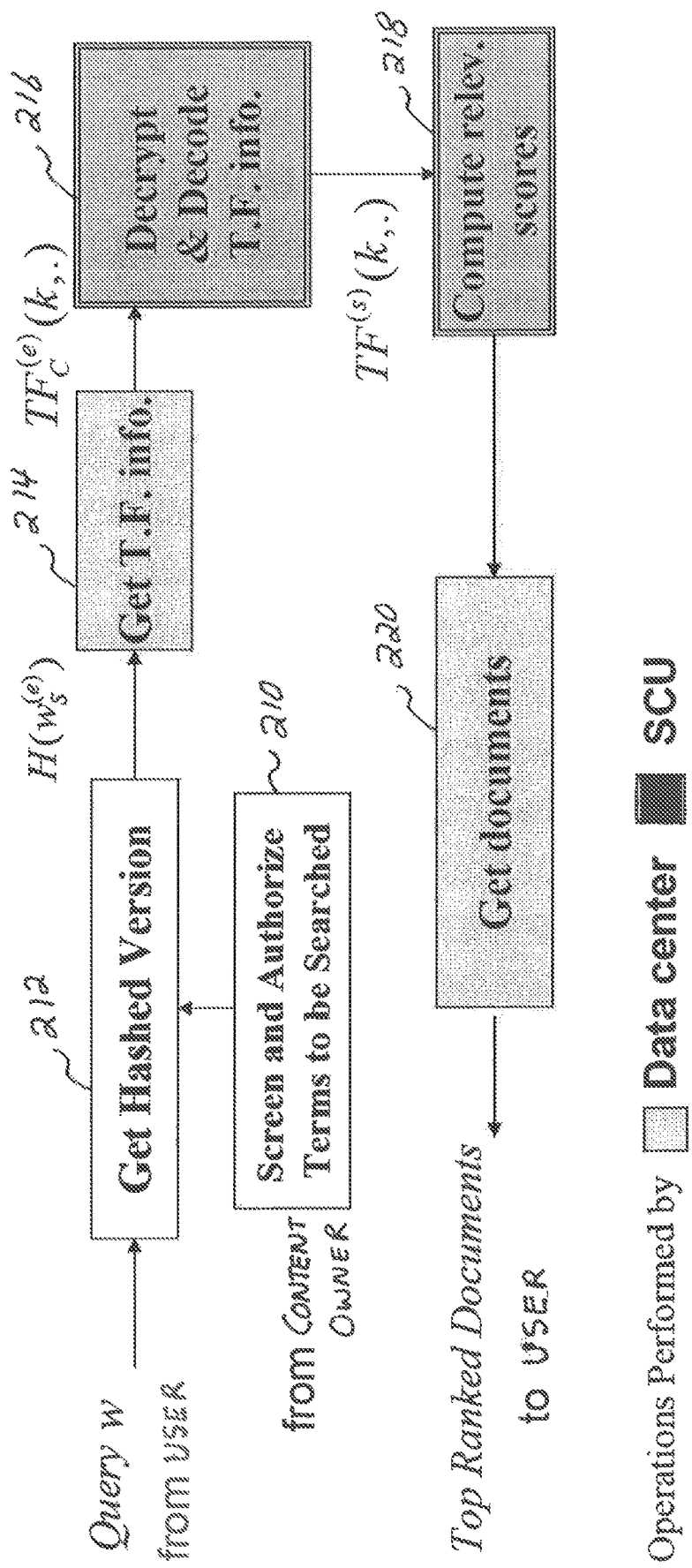
FIG. 4 is a diagram illustrating search and retrieval in a fully server oriented scheme according to the invention.

FIG. 4 is a diagram illustrating search and retrieval in the fully server oriented scheme according to the invention. The indexing and pre-processing stages of the proposed schemes are similar to the baseline model with an additional inner-layer encryption, and the searching stage is shown in FIG. 4. When searching for a particular query consisting of multiple terms, $w(i_1), w(i_2), \ldots, w(i_M)$, in the collection, the user first performs stemming to obtain its corresponding stemmed words. The user then sends the stemmed words to the content owner, who checks if the user has the required permission to search for the query words at location 210. Upon verification, the content owner derives the word-keys from the master key and uses it to encrypt the stemmed-words to obtain $w_s(i_k)^{(e)}$, $k=1,2,\ldots, M$. After that, the hash value of $w_s(i_k)^{(e)}$ is calculated and transmitted to the user who forwards it to the data center. Using the received hash values $H(w_s(i_k)^{(e)}$ from location 212, the data center searches the protected term frequency table $TF_C^{(e)}$ at location 214 and identifies the rows corresponding to the query words. In this way, the data center does not get any information about the query.

After the data center identifies the target rows from the term frequency table $TF_C^{(e)}$, it uses the Secure Computing Unit (SCU) to decrypt and decode it at location 216, and subsequently obtain the corresponding rows of the term frequency table $TF^{(s)}$ that are protected by the inner-layer encryption algorithms. During this stage, the encrypted rows, $TF^{(s)}$, are retained within the SCU and not revealed to the data center. The SCU then performs part or the entire computation for the relevance scores at location 218 in the encrypted domain as shown in FIG. 4. In the homomorphic encryption based scheme (HME), the computation results are then sent to the content owner, who decrypts the results, obtains the relevance score, and rank-orders the documents. Therefore, HME is also referred to as the partially server oriented scheme. The order of the relevant documents pertaining to the user's query is sent back to the data center who gives the user the corresponding documents at location 220. On the other hand, in the order preserving encryption based scheme (OPE), the entire computational burden is shifted to the SCU, which computes relevance scores, rank-orders the documents, and directly sends back to the user the most relevant documents with their ranking information. The OPE is also referred to as the fully server oriented scheme.

The main difference between the HME and the OPE schemes is the additional round of communication between the data center and the content owner, and the need of using the content owner's decryption key. As discussed below, the need for this additional round of communication can be offset at the cost of slightly reduced retrieval accuracy. In the following sections, details of the OPE and HME schemes are discussed.

Approach/Scheme II—Fully Server Oriented Scheme Based on Order Preserving Encryption To remove the need of communications between the data center and content owner during content search, computations and ranking are performed directly on term-frequency data in its inner-encrypted form. Discussed herein is an order preserving encryption scheme (OPE) as the inner-layer encryption and the method of computing and ranking relevance scores in the encrypted domain.

Figure 5A:
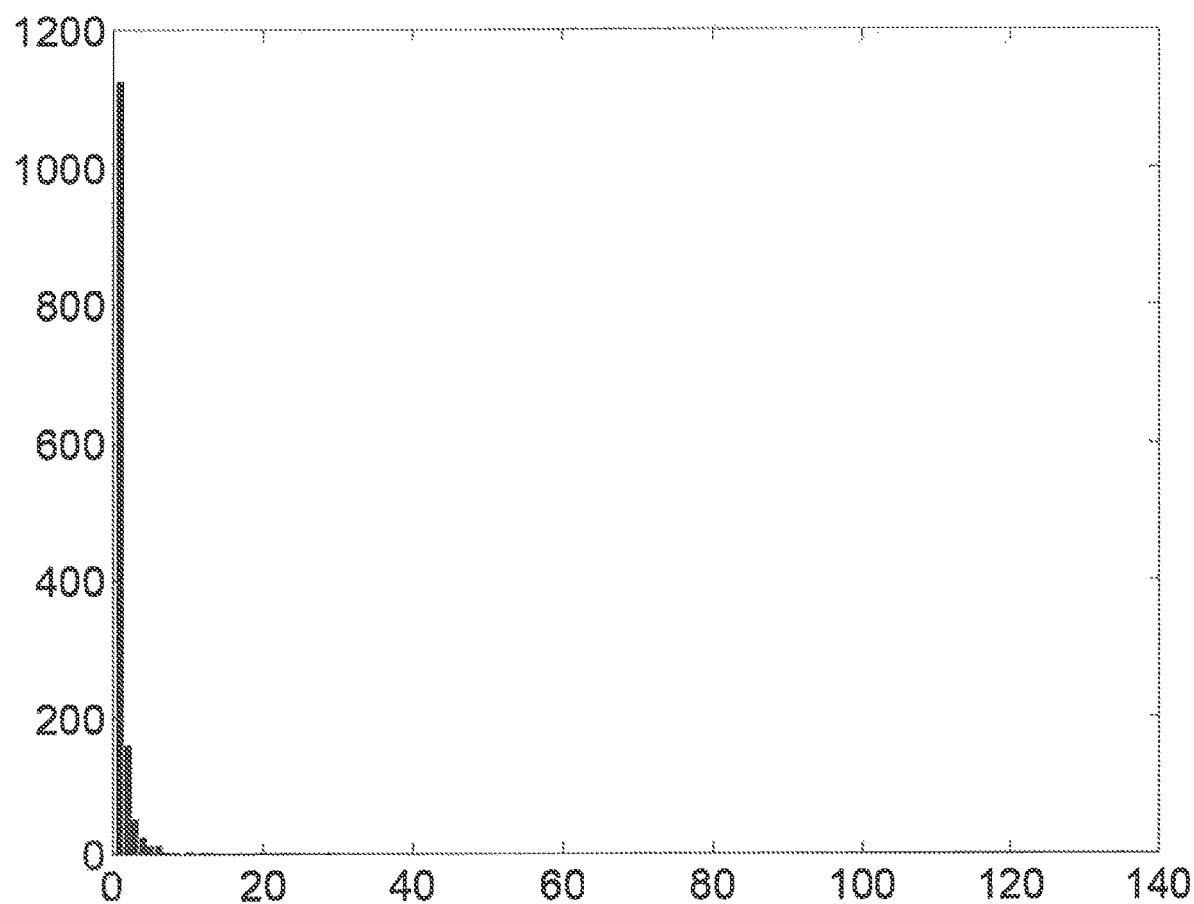
FIGS. 5A and 5B are examples of term frequency histograms.
Figure 5B:
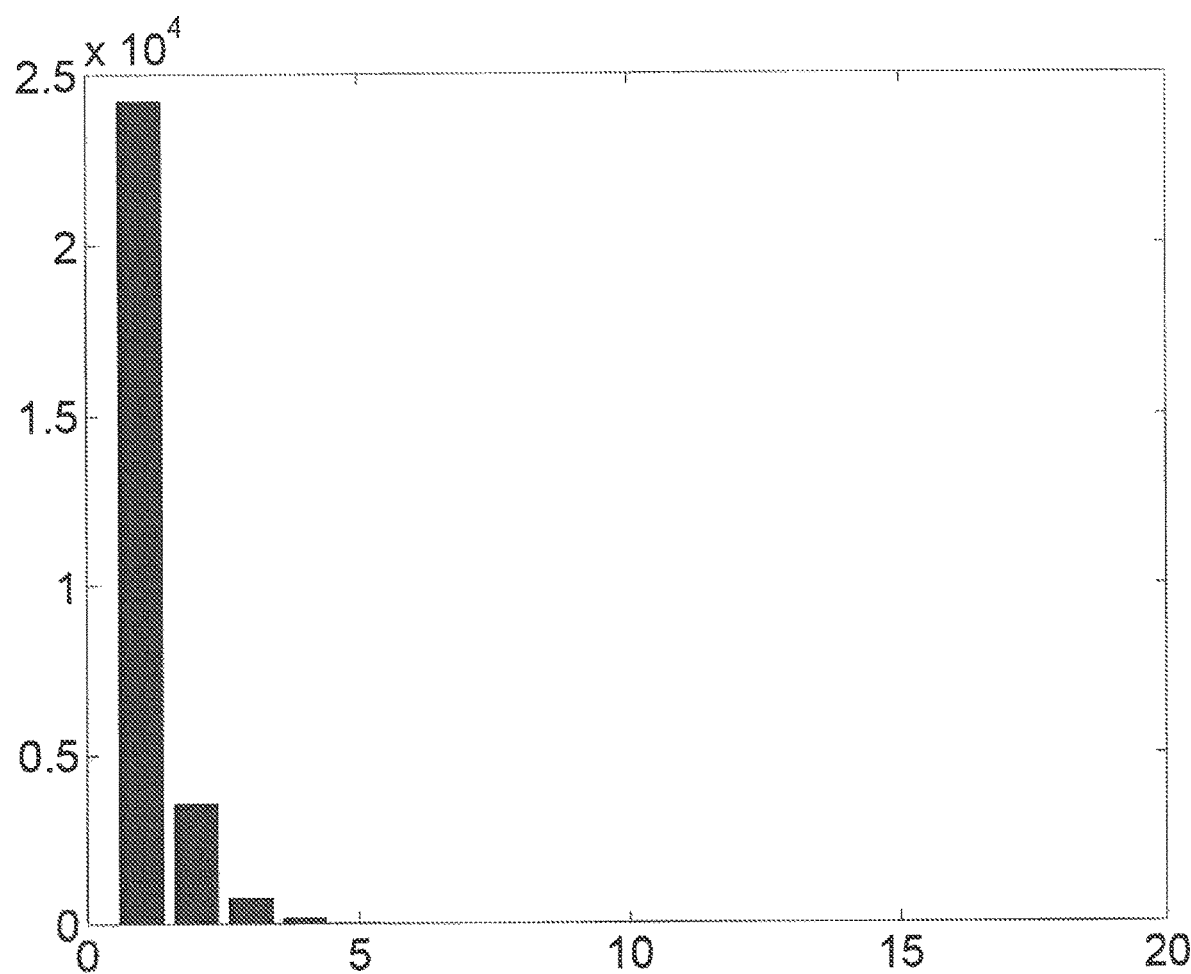

More specifically, order preserving encryption is applied on $TF(i, j)$ to obtain encrypted $TF^{(s)}(i, j)$ in the inner-layer encryption step, i.e., if $TF(i, j) < TF(i, k)$, then $TF^{(s)}(i, j) < TF^{(s)}(i, k)$. Due to the monotonicity of the relevance score function in EQ-1, as long as the order of relevance scores (or the order of term frequency values) is preserved, rather than their exact values, the correct search results can be obtained for queries that involve only one term. Based on the experimental analysis on the Enron e-mail corpus discussed earlier, generally peak histograms are observed for the term frequency values over a large number of rows, and some examples are shown in FIGS. 5A and 5B. Applying the existing algorithms of order preserving encryption to such generally peaking distributions would not be able to randomize the term frequency values, since their one-to-one mapping operation will largely retain generally peaking nature of term frequency distributions, leaking valuable information to the server. Therefore, in order to enhance security and prevent the leak of term-frequency information, appropriate one-to-many mapping is required to flatten the generally peaking distribution to an approximately uniform distribution and increase its randomness.

In the one-to-many order preserving encryption method, the encryption is performed row by row for each of the $N^{(TF)}$ terms. The generally peaking structure of term frequency distribution reflects that there are a large number of entries having the same term frequency value in individual row of the term frequency table. In order to flatten the generally peaking distribution, every entry $TF(i, j)$ is mapped with the value tf to a random number in the range of $[tf^l, tf^u]$, where $0 \leq tf^l \leq tf^u < 2^B$ (B=8 in the experiment) are the lower bound and the upper bound of the random mapping range that must be carefully chosen. In order to make the one-to-many mapping an order preserving operation, for two different term frequency values $tf_1$ and $tf_2$, their random mapping ranges $[tf_1^l, tf_1^u]$ and $[tf_2^l, tf_2^u]$ are chosen to satisfy the following constraint:

$$\text{if } tf_1 < tf_2, \text{ then } tf_1^u < tf_2^l \qquad (EQ\text{-}3)$$

To maximize the entropy of the encrypted output, the random mapping range $[tf^l, tf^u]$ for a term frequency value tf is adaptively determined according to the distribution of row term frequency values, so that an approximately uniform distribution can be obtained for the encrypted term frequency values $TF^{(s)}(i, j)$. More specifically, the width of the random mapping range $[tf^l, tf^u]$ is chosen proportional to the counts of tf in that particular row. The values of $tf^l$ and $tf^u$ are then determined with $0 \leq tf^l < tf^u \leq 2^B$ and the constraint in EQ-3. In this way, an approximately uniform distribution can be obtained for the encrypted $TF^{(s)}(i, j)$ at individual rows.

Figure 5C:
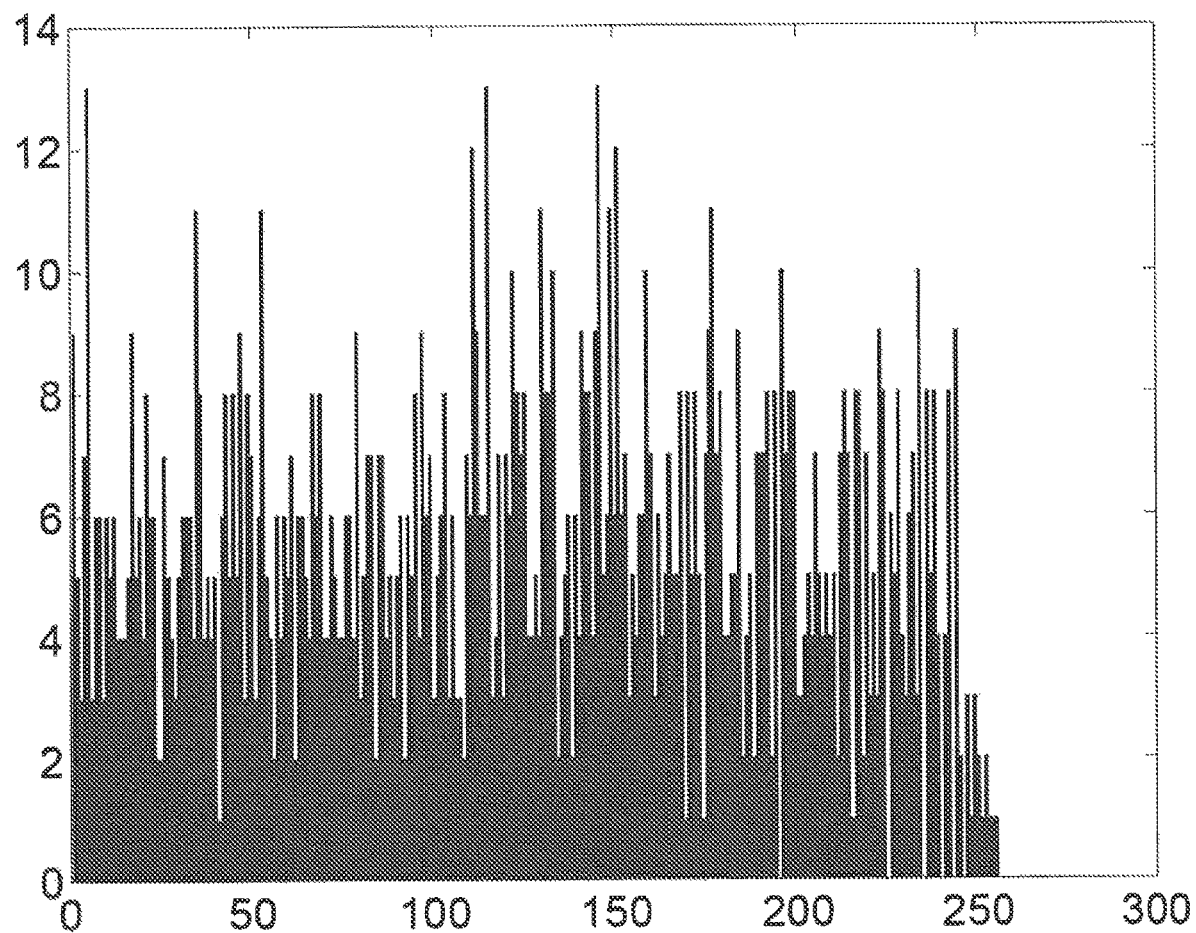
FIGS. 5C and 5D are the corresponding histograms of the encrypted term frequency values.
Figure 5D:
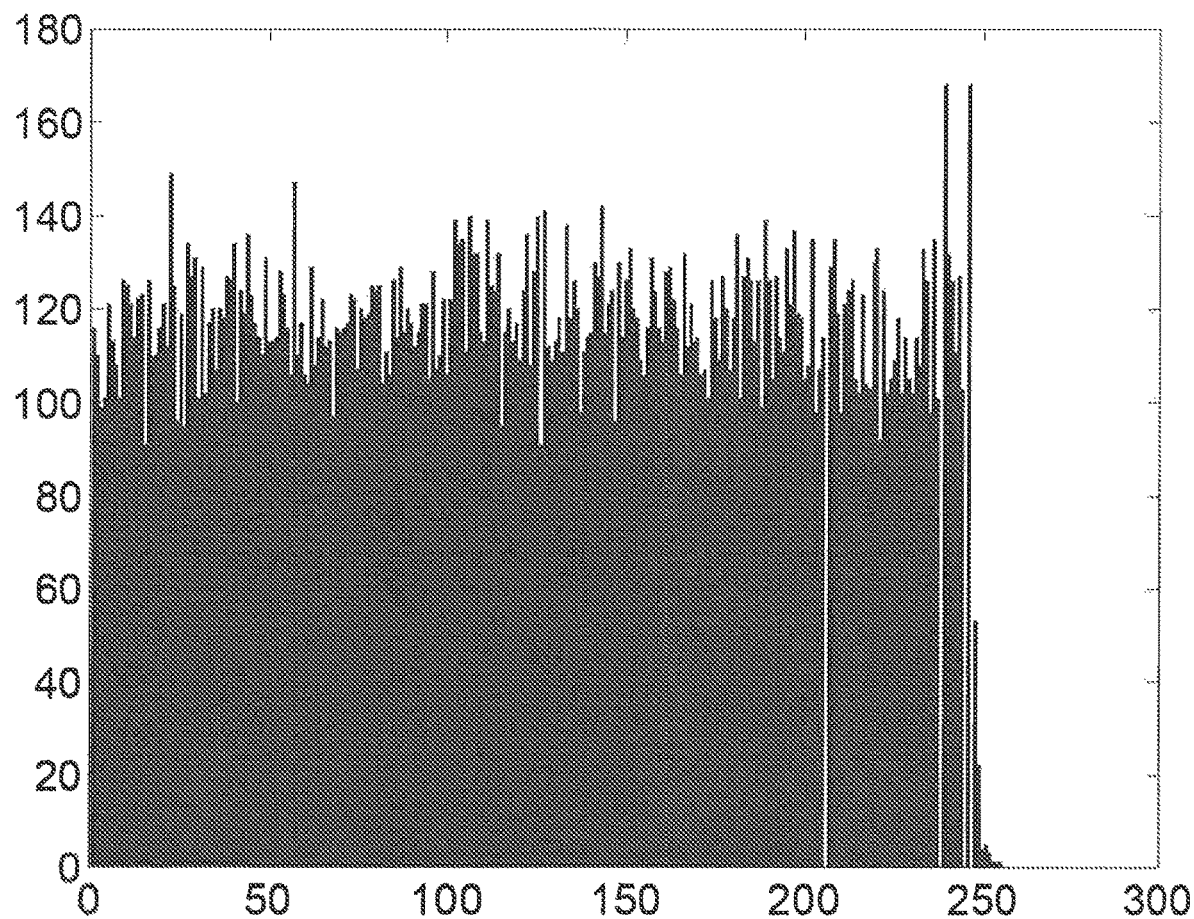

FIGS. 5A and 5B, briefly discussed above, are examples of term frequency histograms, and FIGS. 5C and 5D are the corresponding histograms of the encrypted term frequency values. Applying the proposed random mapping method to the two histograms shown in FIGS. 5A and 5B, with the random mapping range determined for individual rows, encrypted $TF^{(s)}(i, j)$ is obtained with histograms shown in FIGS. 5C and 5D, respectively. It can be seen that approximately uniform distributions are obtained after the one-to-many order preserving encryption, even though the distributions of row term frequency values are quite different in these two examples. This indicates that the confidentiality of critical term frequency information can be protected from both hackers, unauthorized users, and the data center that carries out the search task.

Approach/Scheme III—Partially Server Oriented Scheme Using Homomorphic Encryption In the partially server oriented scheme discussed herein, after the term frequency rows $TF_C^{(e)}(i_1,.)TF_C^{(e)}(i_2,.), \ldots, TF_C^{(e)}(i_M,.)$ go through outer-layer decryption and decompression, the server will perform part of the combination, which is then sent back to the user side for obtaining the final relevance scores. The basis for the partially server oriented scheme is that in some scenarios such as that of a mobile computing unit, the computation power of the client and the bandwidth of the communication channel may be severely limited and the MedSCU can help perform certain computations in a secure manner Hence, the amount of data transferred between the client and server and the amount of computation to be performed by the client should be minimized.

Figure 6:
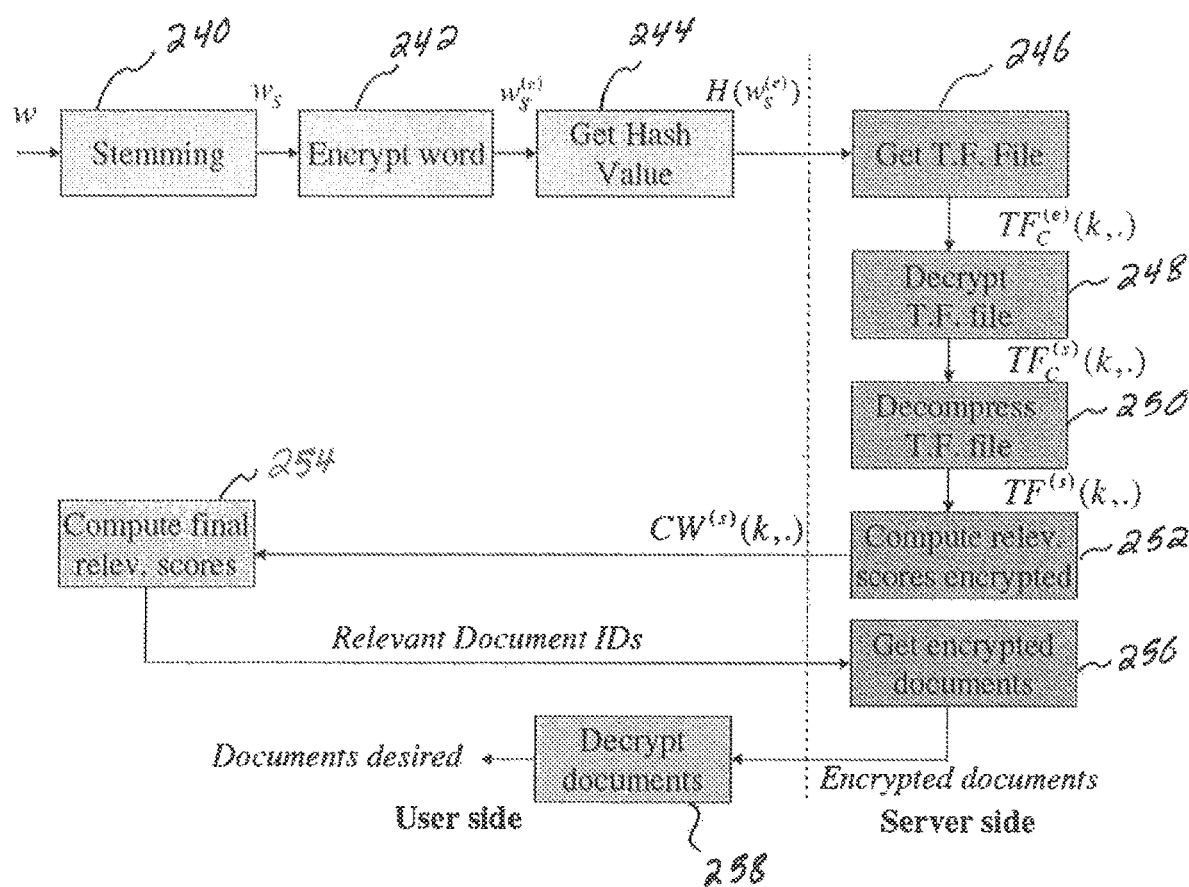
FIG. 6 is a diagram illustrating the partially server oriented scheme according to the invention.

FIG. 6 is a diagram illustrating the partially server oriented scheme according to the invention. As shown in FIG. 6, when searching for a particular word w in the database, the user side first performs stemming at location 240 to obtain its corresponding stemmed word $w_s$. The word-key is then derived from the master key and used to encrypt the stemmed-word $w_s$ to be $w_s^{(e)}$ at location 242. After that, the hash value of $w_s^{(e)}$ is calculated at location 244 and transmitted to the server side. Using the received hash value H $w_s^{(e)}$, the server can search the protected term frequency table $TF_C^{(e)}$ at location 246 and identify the row corresponding to the query word w.

After the server identifies the target row $TF_C^{(e)}(k,.)$ at location 246 from the term frequency table $TF_C^{(e)}$, in the partially server oriented scheme, the server itself decrypts and decompresses it at locations 248, 250 and subsequently obtains term frequencies $TF^{(S)}(k,.)$ that are protected with inner-layer encryption algorithms. The server then performs part of or all the computation at location 252 in finding the relevance scores in the encrypted domain. After that, the server sends the computation results back to the user side at location 254, which then decrypts the received results and further rank-orders the documents. The encrypted documents are then obtained at location 256, and returned to the user at location 258 for decryption.

In further detail, for the partially server oriented scheme, for a query submitted by the user, the server first extracts the corresponding term-frequency rows stored in the encrypted format. For each of the identified rows, $TF_C^{(e)}(i,.)$, the server decrypts it using the word key and then decompresses it to obtain $TF^{(s)}(i,.)$ with an inner-layer encryption. Then, in this encrypted domain, at location 252 as discussed above, the server performs certain computations toward finding the relevance scores. The computation results are then sent back to the user, who uses the decryption keys to find the actual values of the relevance scores at location 254. The user then rank orders the documents using the derived relevance scores and requests the most pertinent documents from the server at location 256. Similar to the baseline scheme, the partially server oriented scheme also involves two rounds of communication. In the first round, the user sends the query word(s) and gets the encrypted relevance scores from the server. The user then processes the results to find the relevant documents and requests the documents in the second round. Unlike the baseline scheme, this method does not require transmission of all term frequency files related to a query. Therefore, it needs much lower bandwidth in the searching process and would be feasible for low-bandwidth scenarios.

When the server performs the computation of relevance scores, it works on term frequencies $TF^{(s)}(i,.)$ with an inner-layer encryption. Therefore, the security of the term frequency information with respect to the server itself largely depends on the nature of the inner-layer encryption. Meanwhile, computation results on $TF^{(s)}(i,.)$ should benefit the user side in the subsequent sorting of final relevance scores. In the following, we show that Homomorphic encryption algorithms may be used to encrypt the term-frequency values to enable performing arithmetic computations in the encrypted domain.

Secure Computation of Relevance Scores based on Homomorphic Encryption

Generally, when the SCU performs the computation of relevance scores, it works on term frequencies rows, $TF^{(s)}(i,.)$, encrypted with an inner-layer encryption. Therefore, the security of the term frequency information with respect to the SCU itself largely depends on the nature of the inner-layer encryption. Meanwhile, computation results on $TF^{(s)}(i,.)$ should benefit the content owner in the subsequent sorting of final relevance scores. Homomorphic encryption algorithms may be used to encrypt the term-frequency values to enable performing arithmetic computations in the encrypted domain (see J. Domingo-Ferrer, "A New Privacy Homomorphism and Applications," *Information Processing Letters*, Vol. 60, No. 5, pp. 277-282, December 1996, and R. L. Rivest, L. Adleman, and M. L. Dertouzos, "On Data Banks and Privacy Homomorphisms," *Foundations of Secure Computation*, Academic Press, 1978, pp. 169-179). The RSA encryption and symmetric homomorphism schemes that may be used will now be discussed in detail.

RSA Based Approach

The RSA public-key cryptosystem involves a public key (n, e) and a private key (n, d) such that e d≡1(mod n). A message $m \in Z_n = \{0, 1, 2, \ldots, n-1\}$ is encrypted using the public key (n, e) as $c=RSA(m)=m^e(\mod n)$. The message can then be recovered using the private key (n, d) as $m=c^d(\mod n)$. The RSA encryption scheme has the following property:

$$(RSA(m_1) * RSA(m_2)) \mod n = m_1^e(\mod n) * m_2^e(\mod n), \quad \text{(EQ-4)}$$

$$= (m_1 m_2)^e (\mod n),$$

$$= R, SA(m_1 * m_2).$$

This homomorphic property is used to perform relevance score computations at the server's end. To facilitate easy computations in the encrypted domain, the relevance score defined in EQ-1 is approximated as follows:

$$CW(i, j) \approx \frac{CFW(i)TF(i, j)(K_1 + 1)}{K_1}, \quad \text{(EQ-5)}$$

$$= C(i)TF(i, j),$$

where $$C(i) = \frac{CFW(i)(K_1 + 1)}{K_1} \quad \text{(EQ-6)}$$

and can be calculated with the knowledge of number of documents that do not contain the $i^{th}$ word. In arriving at EQ-5, the TF(i,j) term is ignored in the denominator of EQ-1 and it is assumed that NDL(j)≈1, i.e. the length of all documents is approximately the same and equal to the average length. Although ignoring the TF(i,j) term in the denominator would change the actual value of CW(i,j), the relative order is still preserved as both functions are monotonic in TF(i,j). For queries containing multiple terms, EQ-5 is used to compute the relevance score for document D(j) for each word in the query, $CW(i_1, j)$, $CW(i_2, j)$, . . . , $CW(i_m, j)$ and the final relevance score is calculated by $$CW(j)=CW(i_1, j)+CW(i_2, j)+ \ldots +CW(i_M, j) \quad \text{(EQ-7)}$$

TABLE II

Evaluation of the Retrieval Results using the Simplified Relevance Score in EQ-5

|  | Number of Search Terms | | | |
|---|---|---|---|---|
| Ranks | 1 | 2 | 3 | 5 |
| Top 10 | 10 | 10 | 9 | 7 |
| Top 20 | 20 | 20 | 20 | 18 |
| Top 50 | 50 | 50 | 50 | 48 |
| Top 100 | 100 | 100 | 100 | 100 |

To evaluate the performance of the search method using the approximation in EQ-5, the number of documents that are in the top 10, top 20, etc. retrieved using the original OKAPI score are counted and the results are compared with the ones obtained with the score calculated using EQ-5. Table II shows the results obtained. It should be noted that the approximation does not affect the performance of the retrieval system when searching for smaller number of query terms, and the performance gradually reduces as the number of query terms increase. This justifies the approximation in EQ-5.

While creating the database, the term frequency table $TF(i,.)$ is first encoded using RSA to obtain $TF^{(s)}(i,.)=RSA(K_1^{(s)}, TF(i,.))$. The encrypted table is then compressed and encrypted again using a symmetric encryption function E and key $K_i^{(TF)}$ to obtain $TF^{(e)}(i,.)=E(K_i^{(TF)}, TF_C^{(s)}(i,.))$ which is stored in the database. The encrypted value of $C(i)$, $C^s(i)=RSA(K_i^{(s)}, C(i))$ is also stored.

In the searching phase, the client sends the query with terms and the corresponding keys $K_{i1}^{(TF)}, K_{i2}^{(TF)}, \ldots K_{iM}^{(TF)}$, to the server. For computing the relevance score, $CW(i_M, j)$, $TF^{(e)}(i_m,.)$ is decrypted using the decryption function D and key $K_{im}^{(TF)}$ and decompressed to obtain $TF^{(s)}(i_m,.)$. The server then performs the following computation to obtain the encrypted values of the relevance scores $$RSA(K_{im}^{(s)}, CW(i_m, j)) = RSA(K_{im}^{(s)}, C(i_m, j)) * RSA(K_{im}^{(s)}, TF(i_m, j)) \pmod{n} \quad \text{(EQ-8)}$$

The server then returns $RSA(K_{im}^{(s)}, CW(i_m,.))$, $m=1,2,\ldots M$ to the client which decrypts, sums, and sorts the scores. The client then requests the relevant files from the server.

The RSA based scheme has the advantage that the relevance scores are computed on the server without sacrificing security. However, the amount of data that needs to be transferred to the client is still proportional to the number of terms in the query. This is due to the fact that the only operation that is homomorphic in RSA is multiplication, which limits the operations that can be performed on the server without sacrificing security. To overcome this limitation, a scheme based on a homomorphic encryption scheme may be utilized, as discussed below.

Symmetric Homomorphism Based Approach

A key-dependent homomorphic encryption algorithm $g_K$, with key K, operating on data items $x_1$ and $x_2$, satisfies $g_K(x_1+x_2)=g_K(x_1)+g_K(x_2)$, $g_K(x_1*x_2)=g_K(x_1)*g_K(x_2)$, and $g_K(x_1*c)=c*g_K(x_1)$ for any constant c. Thus, the function $g_K$ is homomorphic with respect to addition and multiplication operations. Division can then be performed by treating it as operations on rational numbers, and the numerator and denominator terms can be computed separately as follows:

$$g\left(\frac{x_1}{x_2} + \frac{x_3}{x_4}\right) = \frac{g(x_1)*g(x_4) + g(x_2)*g(x_3)}{g(x_2)*g(x_4)} \quad \text{(EQ-9)}$$

These properties can be used to efficiently compute the relevance scores. Referring to EQ-1, the Okapi relevance score can now be written as follows:

$$CW(i,j) = \frac{TF(i,j)C1(i)}{TF(i,j)+C2(j)} = \frac{Num(i,j)}{Den(i,j)} \quad \text{(EQ-10)}$$

where $C_1(i) = (K_1+1)CFW(i)$ and
$C_2(j) = K_1(1-b+b \times NDL(j))$.

In the pre-processing stage, the content owner encodes each row of the term frequency table $TF(i,.)$ separately using homomorphic encryption to obtain $TF^{(s)}(i,.)=g_K(TF(i,.))$, and these results are used in the search stage. The values of the constants $C_1(i)$ and $C_2(j)$ are also computed and stored along with the encrypted term frequency rows $TF^{(e)}(i,.)$. In the search phase, suppose that a query contains the terms, $w(i_1), w(i_2), \ldots, w(i_m)$; for each term in the query, the SCU decrypts and decodes the corresponding term frequency row to obtain $TF^{(s)}(i_m,.)$. It then obtains the numerator and denominator of $g_K(CW(i_m,j))$ for each query term using $$g_K(Num(i_m,j)) = C_1(i_m)*g_K(TF(im,j)) \quad \text{(EQ-11)}$$

$$g_K(Den(i_m,j)) = C_2(j_m)+g_K(TF(i_m,j)) \quad \text{(EQ-12)}$$

The overall encrypted value of the relevance score, $g_K(CW(j))$, is then obtained by adding the relevance scores in the encrypted domain and can be shown to be $$g_K(CW(j)) = \frac{\sum_{m=1}^{M} g_K(Num(i_m,j)) \prod_{\substack{n=1 \\ n \neq m}}^{M} g_K(Num(i_n,j))}{\prod_{m=1}^{M} g_K(Den(im,j))} \quad \text{(EQ-13)}$$

In the absence of the decryption key, the exact value of the relevance score cannot be computed by the SCU, and the numerator and denominator of $g_K(CW(j))$ are sent to the content owner/supervisor. The content owner decrypts with the secret key to obtain the actual numeric values of $Num(j)$ and $Den(j)$ to compute the relevance score for each document. The content owner then sorts the relevance scores and sends the list of relevant documents to the data center who retrieves them from his/her collection for the user.

Comparison of RSA and Homomorphic Encryption Approaches

The proposed symmetric homomorphic encryption based scheme has the advantage that the amount of data transferred between the server and the client is independent of the number of terms in the query. Also the amount of computation that has to be performed on the client side is reduced by shifting most of the computation operation to the servers side. However, this necessitates that the keys used for encrypting the rows of the Term Frequency table $TF(i,.)$, $K_i^{(s)}$ be the same. In contrast, the RSA based scheme does not require that the keys used for encrypting the rows of the term frequency table be the same. The consequence is the relatively larger amount of data that needs to be transferred from the server to the client. Thus, depending on the usage scenario, the user may choose one of the two options.

Results/Discussion

Performance of the homomorphic encryption (HME), the order-preserving encryption (OPE), and the baseline model will now be compared in terms of security, retrieval accuracy, and tradeoffs involved in securing the term frequency using order preserving encryption will be examined. The retrieval accuracies of the secure search schemes will be evaluated on the W3C collection, and the 59 queries used for the discussion search in the enterprise track in the 2005 Text Retrieval Conference (TREC). Any document that is judged partially relevant or relevant is taken to be relevant (i.e. conflating the top two judgment levels). In terms of retrieval accuracy, the performance of the HME scheme should be identical to the baseline model as it also has the accurate term frequency information to compute the relevance score.

Figure 7:
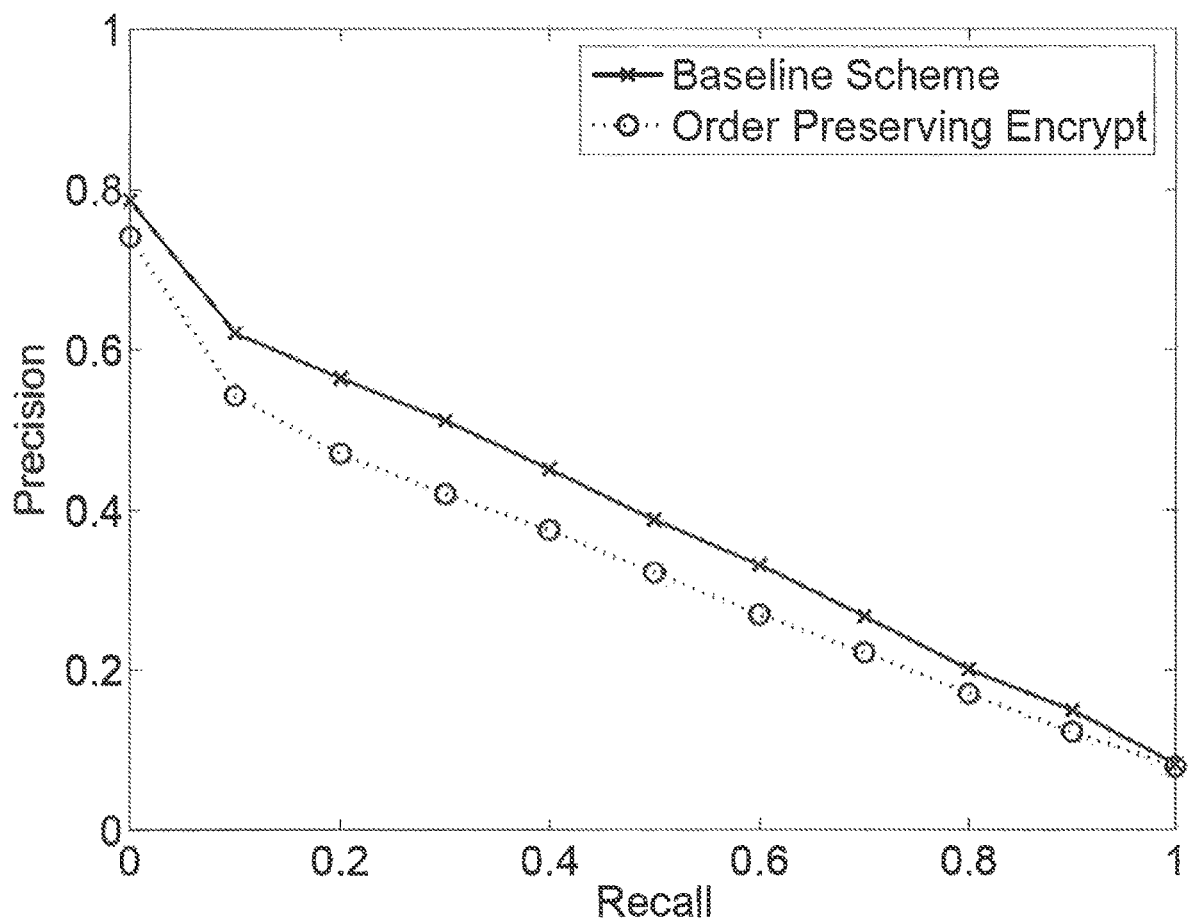
FIG. 7 is a precision-recall graph for the baseline scheme, and the order-preserving encryption scheme according to the invention.

The performance of the proposed schemes is discussed using precision-recall graphs. The precision-recall results for all 59 queries are collected and the average performance is shown in FIG. 7, which shows that the retrieval accuracy of the OPE is slightly lower than that of the baseline scheme. However, this slight drop in performance in OPE comes with added advantages of fewer communication rounds compared with the HME and the baseline schemes.

TABLE III

Retrieval Accuracy Measures for Various Schemes

| METRIC | BASELINE | OPE |
|---|---|---|
| MAP | 0.3739 | 0.3142 |
| r-prec | 0.3878 | 0.3476 |
| bpref | 0.3798 | 0.3412 |
| P@5 | 0.5424 | 0.5017 |
| P@10 | 0.4881 | 0.4627 |
| P@20 | 0.4271 | 0.3829 |
| P@30 | 0.3791 | 0.3271 |
| P@100 | 0.2366 | 0.2056 |
| P@1000 | 0.0471 | 0.0422 |
| RR1 | 0.7257 | 0.6749 |

The search-retrieval accuracy of the proposed schemes is also examined using a set of common evaluation metrics discussed in N. Craswell, A. P. de Vries, and Ian Soboroff, "Overview of the TREC-2005 Enterprise Track," *Text Retrieval Conference,* 2005, and "Common Evaluation Measures," Appendix to the Proceedings of Text Retrieval Conference, 2005. The evaluation results are shown in Table 1. Comparing with the results published in the "Overview of the TREC-2005 Enterprise Track" document, with the values in Table 1, the baseline scheme using the Okapi relevance score would have been ranked second in the evaluation, suggesting that the retrieval accuracy for the baseline scheme is as good as the state of the art in the information retrieval literature that do not take account of security issues. With regard to the OPE, even with the added layer of security, the performance would have appeared in the top five search retrieval schemes evaluated in the TREC 2005 conference.

Figure 8:
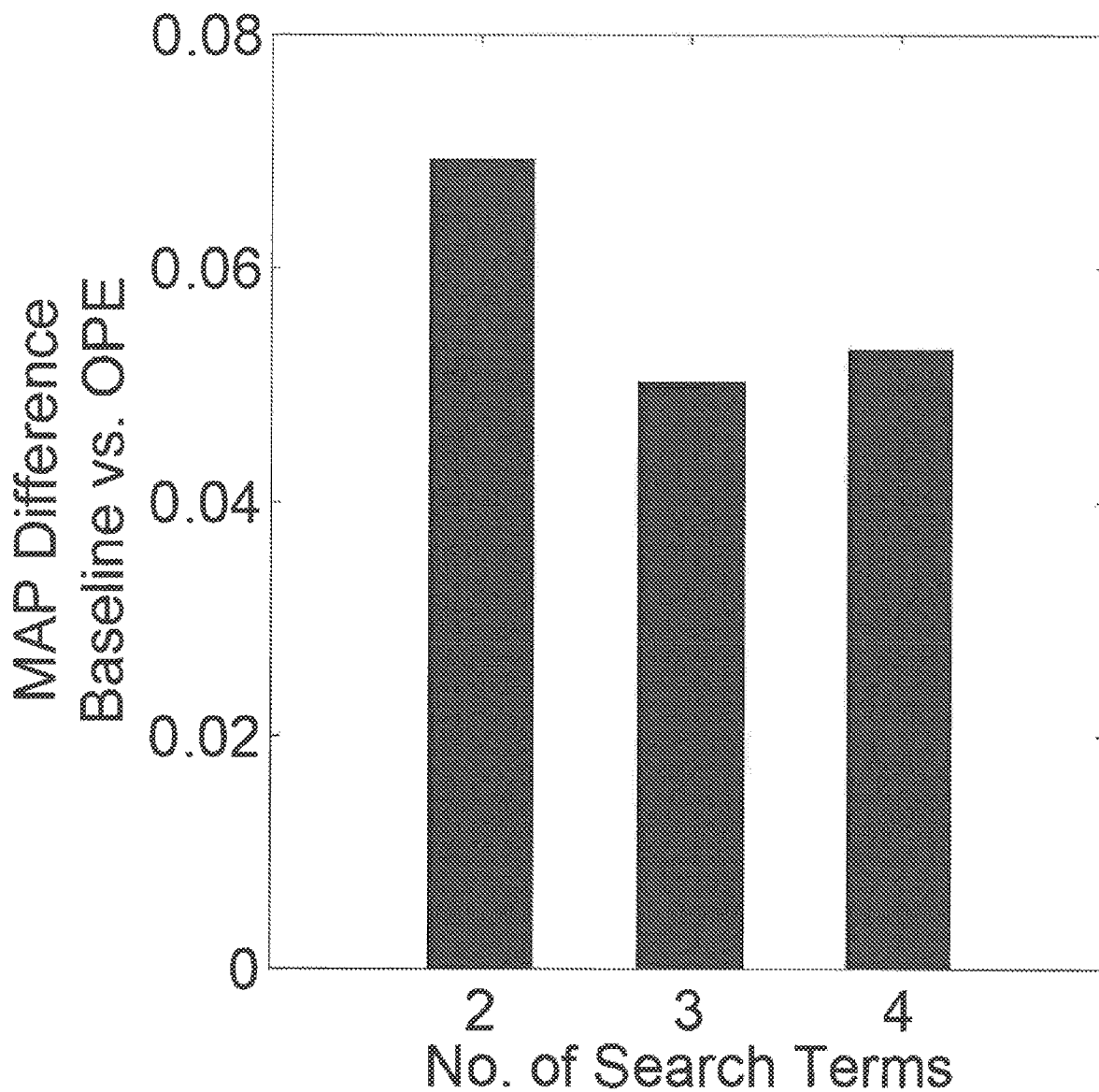
FIG. 8 is a graph illustrating the difference in Mean Average Precision (MAP) between the baseline and order-preserving encryption schemes according to the invention.

By introducing the order-preserving encryption on row term frequency values, the OPE enables document search on the data center side while preventing it from learning the critical term frequency information. When a query contains a single term, the OPE can achieve effective search as the baseline model by accurately identifying the target documents. This is because the order of term frequency values are preserved after the inner-layer encryption, and the relevance score is a strictly increasing function of the term frequency. As the number of terms in a query increases, the order may not be completely preserved when summing up scores of all terms. To examine the search accuracy for multiple terms, FIG. 8 shows the differences in the Mean Average Precision (MAP) for the baseline scheme and that for the order-preserving encryption scheme for different numbers of search terms. As the majority of queries in the W3C experiments, for which the ground-truth is available, include 2 to 4 terms, the search accuracy is examined and compared with the number of searched terms within this range. With multiple terms in a query, the accuracy of OPE is only within a small gap from that of the baseline model. Thus, the number of search terms in the query does not affect the performance of the OPE scheme. These results show that the OPE scheme is capable of effectively processing multiple-term queries while maintaining confidentiality of the content statistics.

Figure 9:
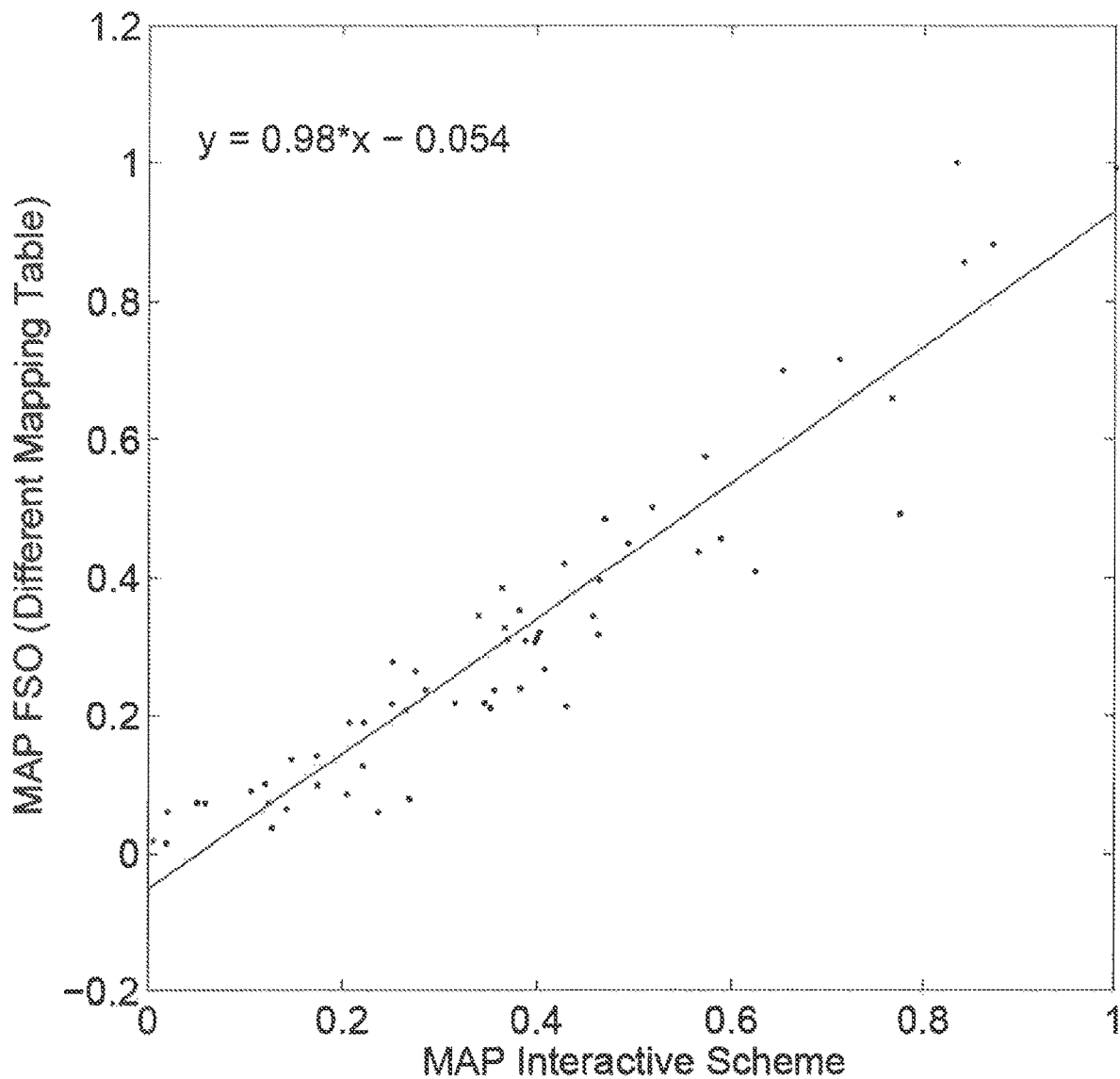
FIG. 9 is scatter plot of Mean Average Precision (MAP) values for the order-preserving encryption scheme with different mapping table for each row of a TF table, plotted with respect to the baseline scheme.

FIG. 9 shows a scatter plot of the Mean Average Precision (MAP) values for the fully server oriented (FSO) scheme plotted with respect to the baseline scheme for the 59 search queries in the W3C database. The figure shows strong correlation, with the slope of the best linear fit close to 1, indicating that there is no significant reduction in performance for the FSO scheme compared to the baseline scheme.

Figure 10:
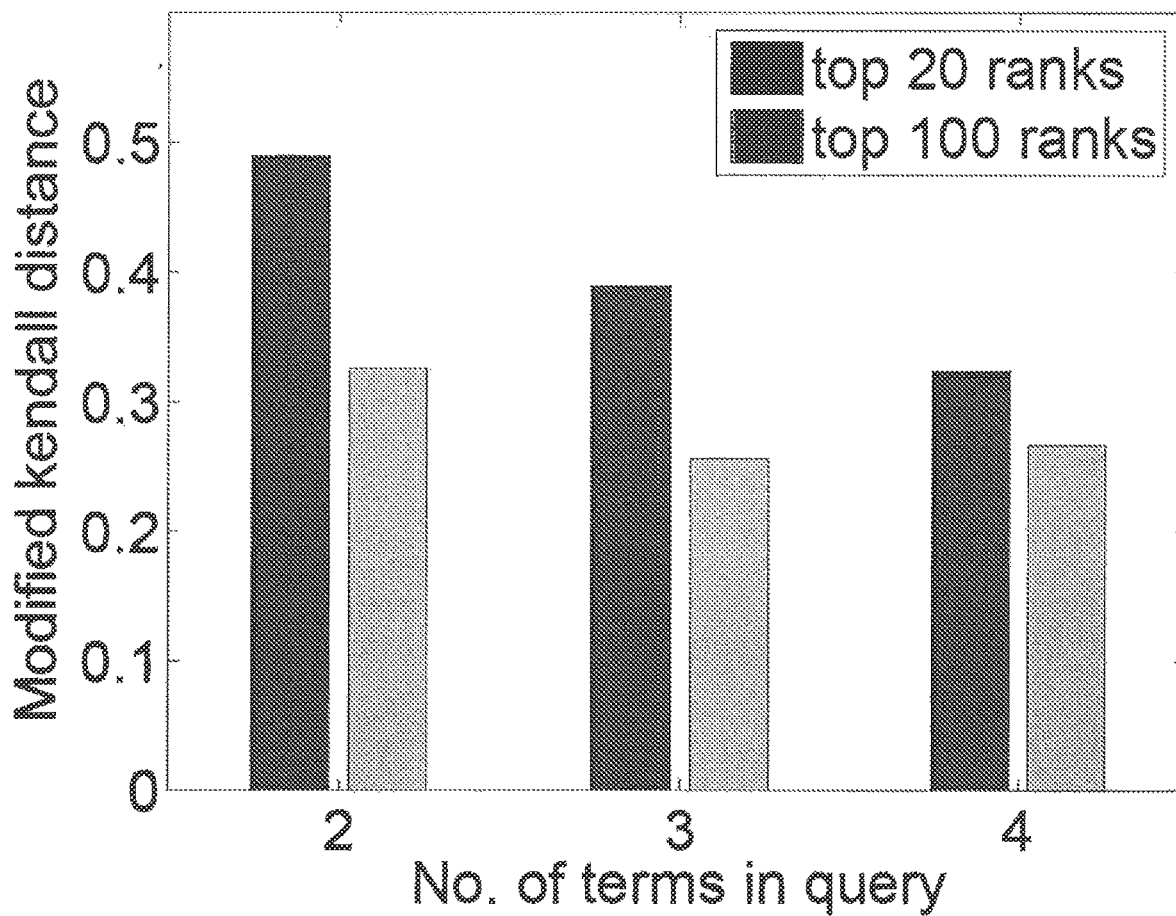
FIG. 10 is a graph illustrating use of a modified Kendall distance measure for comparing top 20 and top 100 ranks obtained using the baseline and order-preserving encryption schemes according to the invention.

As shown in FIG. 10, to compare the ranking accuracies, the modified Kendall distance measure proposed in "Common Evaluation Measures," Appendix to the Proceedings of Text Retrieval Conference, 2005, are used to compare the top 20 and top 100 ranks obtained using the baseline scheme and the FSO scheme. The distance between the top 20 ranks for the FSO scheme and the baseline scheme is approximately 0.42 and the corresponding value for the top 100 ranks is approximately 0.29. The distance for the top 20 ranks is higher because the random mapping may change the order of the top 20 ranks. However, for the top 100 ranks the distance is much lower because most of the top 100 documents are common between the two lists.

Certain aspects of the proposed framework, as related to security, storage efficiency, search accuracy, and system complexity, will now be discussed. If efficient storage of term frequency is needed, the inner layer encryption in HME and OPE would have to retain the sparsity of the TF table by keeping the zero-valued terms. Thus the SCU may gain knowledge of the zero-valued TF, without knowing which plain-text term and which document these correspond to. The proposed schemes require a secure environment to initially generate the encrypted indices and encrypted documents. Usually such initial processing is required only once. However, in the case when the collection is constantly changing, such as by adding more documents or changing the contents in existing documents, the secure index information in HME and OPE should also be updated. For the OPE scheme, the mapping of frequency values for all terms that appear in the new/changed documents should be updated to ensure security and search accuracy. In such cases, the cost of maintaining a secure search system can be relatively high. One method of addressing such incremental changes to the encrypted TF without a complete update, would be to encrypt each document separately, instead of encrypting the documents together. By doing so, while accuracy is slightly reduced due to the different encryptions for the different document, the documents can nevertheless be updated as needed.

The invention thus provides a new framework for secure and confidentiality-preserving search and retrieval in large scale document collections, and techniques for securely rank-ordering the documents and extracting the most relevant documents from an encrypted collection based on the encrypted search queries. The baseline, fully and partially server oriented schemes maintain the confidentiality of the query as well as the content of retrieved documents. The confidentiality preserving system and method described herein are highly secure (relying on the secure cryptographic encryption and hashing algorithms), accurate (comparable to conventional searching systems working with unencrypted data), and efficient (in terms of computational complexity, and communication bandwidth), as demonstrated by experiments with the W3C collection (discussed above). The confidentiality preserving system and method have a wide range of applications, such as searching information with hierarchical access control, flexible "e-discovery" practices for digital records in legal proceedings, a variety of multimedia applications, image/video searching, and finger-print matching etc.

Although several embodiments of this invention have been described above with a certain degree of particularity, those skilled in the art may make numerous alterations to the disclosed embodiments without departing from the scope of this invention. All directional references (e.g., upper, lower, upward, downward, left, right, leftward, rightward, top, bottom, above, below, vertical, horizontal, clockwise and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not as limiting. Changes in detail or structure may be made without departing from the invention as defined in the appended claims.

We claim:

1. A system, comprising:
at least one processor; and
at least one memory comprising computer program code,
wherein the at least one processor and the computer program code are configured to, with the at least one processor, cause the system at least to:
obtain an encrypted term frequency table that comprises encrypted term frequency entries for a plurality of terms in a plurality of documents, wherein each of the encrypted term frequency entries corresponds to a combination of a term among the plurality of terms and a document among the plurality of documents;
apply an additional encryption on the encrypted term frequency table to generate a further encrypted term frequency table, wherein the additional encryption is different from an encryption used to generate the encrypted term frequency table;
store the further encrypted term frequency table in a storage device;
receive a search query comprising a secured query term;
retrieve and decrypt the further encrypted term frequency table to obtain the encrypted term frequency table;
determine from the encrypted term frequency table, one or more encrypted term frequency entries that are associated with the secured query term;
compute relevance scores for at least a subset of documents among the plurality of documents using the one or more encrypted term frequency entries without decrypting the one or more encrypted term frequency entries;
determine at least one document of the subset of documents as relevant to the secured query term based on the computed relevance scores; and
retrieve the at least one document from a secure datastore to satisfy the search query.

2. The system of claim 1, wherein the at least one processor and the computer program code are further configured to, with the at least one processor, cause the system at least to:
rank-order the relevance scores for at least the subset of documents,
wherein the at least one document comprises a document having a highest relevance score.

3. The system of claim 1, wherein the secured query term comprises a hashed version of a search term.

4. The system of claim 1, wherein the encrypted term frequency entries are generated using one or more of a homomorphic encryption or an order-preserving encryption.

5. The system of claim 1, wherein the at least one processor and the computer program code are further configured to, with the at least one processor, cause the system at least to:
compress the encrypted term frequency table,
wherein the additional encryption is applied on the compressed encrypted term frequency table to generate an encoded encrypted term frequency table,
wherein the encoded encrypted term frequency table is stored in the storage device, and
wherein prior to determining the one or more encrypted term frequency entries that are associated with the secured query term, the encoded encrypted term frequency table is retrieved, decompressed, and decrypted to obtain the encrypted term frequency table.

6. The system of claim 1, wherein the encrypted term frequency table is generated at a user site remote from the system.

7. A method in which one or more processing devices perform operations, the method comprising:
receiving a search query comprising a secured query term;
determining, from an encrypted term frequency table, one or more encrypted term frequency entries that are associated with the secured query term, wherein the encrypted term frequency table comprises encrypted term frequency entries for a plurality of terms appearing in contents of a data collection stored in a datastore, wherein each of the encrypted term frequency entries corresponds to a combination of a term among the plurality of terms and a content in the data collection;
applying an additional encryption on the encrypted term frequency table to generate a further encrypted term frequency table, wherein the additional encryption is different from an encryption used to generate the encrypted term frequency table;
storing the further encrypted term frequency table in a storage device;
retrieving and decrypting the further encrypted term frequency table to obtain the encrypted term frequency table;
computing relevance scores for contents in the data collection using the one or more encrypted term frequency entries;
determining at least one content in the data collection as relevant to the secured query term based on the computed relevance scores; and
retrieving the at least one content from the datastore to satisfy the search query.

8. The method of claim 7, wherein the data collection comprises at least one of documents and multi-media content.

9. The method of claim 7, wherein computing the relevance scores for contents in the data collection comprises:
generating, by a first processing device of the one or more processing devices using the one or more encrypted term frequency entries, intermediate results used for computing the relevance scores;
decrypting, by a second processing device of the one or more processing devices, the intermediate results; and
computing, by the second processing device, the relevance scores using the decrypted intermediate results.

10. The method of claim 7, further comprising:
rank-ordering the relevance scores for the contents in the data collection,
wherein the at least one content comprises a content having a highest relevance score.

11. The method of claim 7, wherein the secured query term comprises a hashed version of a search term.

12. The method of claim 7, wherein the encrypted term frequency entries are generated using one or more of a homomorphic encryption or an order-preserving encryption.

13. A non-transitory computer-readable medium having program code that is stored thereon, the program code being executable by one or more processing devices for performing a process, the process comprising:
determining, from an encrypted term frequency table, one or more encrypted term frequency entries that are associated with a secured query term, wherein the encrypted term frequency table comprises encrypted term frequency entries for a plurality of terms appearing in contents of a data collection stored in a datastore;
applying an additional encryption on the encrypted term frequency table to generate a further encrypted term frequency table, wherein the additional encryption is different from an encryption used to generate the encrypted term frequency table;
storing the further encrypted term frequency table in a storage device;
retrieving and decrypting the further encrypted term frequency table to obtain the encrypted term frequency table;
computing relevance scores for contents in the data collection using the one or more encrypted term frequency entries without decrypting the one or more encrypted term frequency entries;
determining at least one content in the data collection as relevant to the secured query term based on the computed relevance scores; and
causing the at least one content to be retrieved from the datastore to satisfy the secured query term.

14. The non-transitory computer-readable medium of claim 13, wherein the data collection comprises at least one of documents and multi-media content.

15. The non-transitory computer-readable medium of claim 13, wherein computing the relevance scores for contents in the data collection comprises:
generating, by a first processing device of the one or more processing devices using the one or more encrypted term frequency entries, intermediate results used for computing the relevance scores;
decrypting, by a second processing device of the one or more processing devices, the intermediate results; and
computing, by the second processing device, the relevance scores using the decrypted intermediate results.

16. The non-transitory computer-readable medium of claim 13, wherein the process further comprises:
rank-ordering the relevance scores for the contents in the data collection,
wherein at least one content of the contents comprises a highest relevance score.

17. The non-transitory computer-readable medium of claim 13, wherein the secured query term comprises a hashed version of a search term.

18. The non-transitory computer-readable medium of claim 13, wherein the encrypted term frequency entries are generated using one or more of a homomorphic encryption or an order-preserving encryption.

* * * * *